United States Patent
Okabe et al.

(10) Patent No.: US 12,180,347 B2
(45) Date of Patent: Dec. 31, 2024

(54) LAMINATED FILM AND METHOD FOR MANUFACTURING SAME

(71) Applicant: UNITIKA LTD., Osaka (JP)

(72) Inventors: Takashi Okabe, Kyoto (JP); Nobuyasu Okumura, Kyoto (JP); Kumi Ashihara, Kyoto (JP)

(73) Assignee: UNITIKA LTD., Osaka (JP)

( * ) Notice: Subject to any disclaimer, the term of this patent is extended or adjusted under 35 U.S.C. 154(b) by 0 days.

(21) Appl. No.: 17/785,564

(22) PCT Filed: Nov. 16, 2021

(86) PCT No.: PCT/JP2021/042041
§ 371 (c)(1),
(2) Date: Jun. 15, 2022

(87) PCT Pub. No.: WO2022/107752
PCT Pub. Date: May 27, 2022

(65) Prior Publication Data
US 2023/0272176 A1    Aug. 31, 2023

(30) Foreign Application Priority Data

Nov. 18, 2020  (JP) ................................. 2020-192092
Sep. 14, 2021  (JP) ................................. 2021-149635

(51) Int. Cl.
| | |
|---|---|
| *C08J 7/04* | (2020.01) |
| *B29C 48/00* | (2019.01) |
| *B29C 48/08* | (2019.01) |
| *B29K 77/00* | (2006.01) |
| *B29K 105/00* | (2006.01) |
| *C08K 7/26* | (2006.01) |

(52) U.S. Cl.
CPC ......... *C08J 7/0427* (2020.01); *B29C 48/0018* (2019.02); *B29C 48/022* (2019.02); *B29C 48/08* (2019.02); *C08K 7/26* (2013.01); *B29K 2077/10* (2013.01); *B29K 2105/251* (2013.01); *C08J 2333/08* (2013.01); *C08J 2377/10* (2013.01)

(58) Field of Classification Search
CPC .... B29C 2071/022; B29C 2948/92704; B29C 48/0018; B29C 48/022; B29C 48/08; B29C 48/154; B29C 48/21; B29C 48/914; B29C 48/9165; B29C 48/92; B29C 55/04; B29C 55/12; B29C 61/06; B29C 71/02; B29D 11/00788; B29K 2077/00; B29K 2077/10; B29K 2105/251; C08J 2333/08; C08J 2377/00; C08J 2377/10; C08J 2433/02; C08J 2475/04; C08J 2477/00; C08J 5/18; C08J 7/042; C08J 7/0427; C08J 7/044; C08J 7/046; C08J 7/06; C08K 7/26
See application file for complete search history.

(56) References Cited

U.S. PATENT DOCUMENTS

| | | | |
|---|---|---|---|
| 2008/0206531 A1* | 8/2008 | Nishi | ..................... B32B 27/34 428/213 |
| 2013/0231424 A1 | 9/2013 | Anada et al. | |
| 2013/0323485 A1 | 12/2013 | Shimizu et al. | |
| 2022/0056229 A1 | 2/2022 | Okabe et al. | |

FOREIGN PATENT DOCUMENTS

| | | |
|---|---|---|
| CN | 101835608 | 9/2010 |
| EP | 3 970 949 A1 | 3/2022 |
| JP | 2002-172695 | 6/2002 |
| JP | 2004-50549 | 2/2004 |
| JP | 2009-234034 | 10/2009 |
| JP | 2013-189495 | 9/2013 |
| JP | 2015-105321 | 6/2015 |
| JP | 2015-151446 | 8/2015 |
| JP | 2016-121349 | 7/2016 |
| JP | 2018-126922 | 8/2018 |
| JP | 2018-135414 | 8/2018 |
| KR | 10-2020-0102206 | 8/2020 |
| TW | I504499 | 10/2015 |
| TW | 201910101 | 3/2019 |
| WO | 2012/067172 | 5/2012 |
| WO | 2018/052104 | 3/2018 |
| WO | 2020/171115 | 8/2020 |
| WO | 2020/230806 | 11/2020 |

OTHER PUBLICATIONS

Korean Office Action dated Aug. 29, 2022 in corresponding Korean Patent Application No. 10-2022-7024783 and English translation.
English machine translation of JP2009-234034.
English machine translation of JP2004-50549.
English machine translation of KR10-2020-0102206.
International Search Report in corresponding PCT application No. PCT/JP2021/042041, dated Jan. 25, 2022.
English machine translation of JP 2015-105321.
English machine translation of JP 2013-189495.
English machine translation of JP 2018-135414.
English machine translation of WO 2018/052104.
English machine translation of JP 2015-151446.
English machine translation of WO 2020/230806 in corresponding EP 3 970 949 A1.
Taiwanese Office Action dated Jun. 20, 2022 in corresponding Taiwanese patent application No. 110142775 and English translation.
Extended European Search Report dated Jan. 10, 2023 in corresponding European Patent Application No. 21894626.7.

(Continued)

*Primary Examiner* — Frances Tischler
(74) *Attorney, Agent, or Firm* — DLA PIPER LLP (US)

(57) ABSTRACT

A laminated film having a resin layer laminated on at least one surface of a base film. The laminated film is characterized by: the base film being a semi-aromatic polyamide film that has been at least uniaxially stretched; the resin layer containing fine particles; the thermal shrinkage factor in the longitudinal direction $S_{MD}$ and the thermal shrinkage factor in the width direction $S_{TD}$ of the film measured under conditions of 250° C.×5 minutes each being −1.0 to 1.5%; the tensile elongations at break in the longitudinal direction and in the width direction each being 70% or more; and the haze being 3% or less.

9 Claims, No Drawings

(56) References Cited

OTHER PUBLICATIONS

English machine translation of JP2016-121349.
Chinese Office Action dated Oct. 26, 2022 in corresponding Chinese Patent Application No. 202180009063.1 and English translation.
English machine translation of JP2002-172695.
English machine translation of CN101835608.
English machine translation of JP2018-126922.
English machine translation of TW201910101.

* cited by examiner

LAMINATED FILM AND METHOD FOR MANUFACTURING SAME

TECHNICAL FIELD

The present invention relates to a laminated film having a resin layer laminated on at least one surface of a base film.

BACKGROUND ART

On the display substrate films used for liquid crystal displays, organic electroluminescent displays, and the like, functional layers are laminated in order to provide various functions. Examples of the functional layers include antistatic layers to provide an antistatic function, antireflection layers to suppress reflection, and hard coat layers to improve surface hardness.

These functional layers are laminated on the base material by coating, vapor deposition, or other methods. For optical applications such as the displays described above, it is important that the functional layers have high adhesiveness with the base material and transparency after lamination. As the method for enhancing the adhesiveness between the functional layer and the base material, a method has been known in which a resin layer with excellent adhesiveness to both the base material and the functional layer is laminated between the base material and the functional layer as an easily-adhesive layer.

Patent Literature 1 discloses a laminated film having a resin layer laminated on at least one surface of a base film made of semi-aromatic polyamide, and the resin layer has excellent close adhesion with the base film and also has excellent adhesiveness with functional layers.

CITATION LIST

Patent Literature

[Patent Literature 1] WO2020/171115

SUMMARY OF INVENTION

Technical Problem

However, although the laminated film disclosed in Patent Literature 1 has excellent adhesiveness between the resin layer and the functional layer, it sometimes has a high haze and is not sufficiently transparent to be used in optical applications. Also, in the laminated film disclosed in Patent Literature 1, when the temperature reaches 250° C., the thermal shrinkage factor in the longitudinal direction of the film is sometimes significantly increased even under the condition of 5 minutes, and depending on the temperature conditions during processing, deformation may be unavoidable due to strain caused by the thermal shrinkage. In addition, although the laminated film disclosed in Patent Literature 1 has a high tensile elongation at break in the longitudinal direction, it sometimes has a low tensile elongation at break in the width direction and may fail to follow external stresses, resulting in breakage.

An object of the present invention is to provide a laminated film having a resin layer formed for laminating a variety of functional layers thereon, which has high transparency required for optical and other applications while maintaining adhesiveness with the functional layers, has sufficiently reduced thermal shrinkage factors in the longitudinal direction and in the width direction of the film, and also has a sufficiently improved tensile elongation at break in the width direction of the film.

Solution to Problem

As a result of investigations, the present inventors have found that, by producing a laminated film having a resin layer laminated on at least one surface of a base film made of a semi-aromatic polyamide film under controlled conditions of the crystalline state of the film before stretching, stretching conditions, heat setting conditions, and relaxation conditions, the obtained laminated film can achieve the object described above, thereby completing the present invention.

A laminated film of the present invention, having a resin layer laminated on at least one surface of a base film, is characterized by that:
  the base film is a semi-aromatic polyamide film that has been at least uniaxially stretched;
  the resin layer contains fine particles;
  the thermal shrinkage factor in the longitudinal direction $S_{MD}$ and the thermal shrinkage factor in the width direction $S_{TD}$ of the film when treated under conditions of 250° C.×5 min are each −1.0 to 1.5%;
  the tensile elongations at break in the longitudinal direction and in the width direction are each 70% or more; and
  the haze is 3% s or less.

According to the laminated film of the present invention, it is preferable that the absolute value of the difference between $S_{MD}$ and $S_{TD}$ ($|S_{MD}-S_{TD}|$) be less than 1.2.

According to the laminated film of the present invention, it is preferable that the resin layer have a thickness of 0.03 to 0.5 μm.

It is preferable that the laminated film of the present invention have a dynamic friction coefficient of 0.7 or less under an atmosphere of 23° C.×50; RH on the surface of the resin layer.

According to the laminated film of the present invention, it is preferable that the base film have the fine particles at a content of 0 to 0.2% by mass and the resin layer have the fine particles at a content of 0.1 to 5.0% by mass.

According to the laminated film of the present invention, it is preferable that a resin constituting the resin layer contain one selected from the group consisting of a polyamide-based resin, a polyurethane-based resin, and an acrylic resin.

An electronic material of the present invention uses the above-described laminated film.

An optical component of the present invention uses the laminated film described above.

A method for producing a laminated film of the present invention is a method for producing the laminated film described above, and suitably includes the following steps (a) to (f):
  (a) extruding a semi-aromatic polyamide from a die and cooling with a moving coolant at 30 to 40° C. to produce an unstretched film with a crystallization heat capacity of 20 J/g or more;
  (b) applying a coating agent for resin layer formation to at least one surface of the film made of semi-aromatic polyamide to form a coating film;
  (c) drying the coating film;
  (d) stretching the film in the longitudinal direction at a ratio of 2.0 to 3.5 times and in the width direction at a ratio of 2.0 to 4.0 times;
  (e) subjecting a stretched film to a heat setting treatment at 252° C. to (Tm−5° C.) and to a relaxation treatment with a relaxation rate of 1.0 to 10.0% in the longitudinal direction and 1.0 to 12.0% in the width direction; and (f) rolling the stretched film up.

[Advantageous Effects of Invention]

According to the present invention, it is possible to provide a laminated film that has high transparency required for optical and other applications while maintaining adhesiveness with functional layers, has sufficiently reduced thermal shrinkage factors in the longitudinal direction and in the width direction of the film, and also has a sufficiently improved tensile elongation at break in the width direction of the film. Also, a resin layer of the laminated film of the present invention has excellent surface slipperiness and blocking resistance, and a laminated body having a functional layer laminated on the resin layer can be made with suppressed deformation such as warpage and curl.

DESCRIPTION OF EMBODIMENTS

Hereinafter, the present invention will be described in detail.

In the laminated film of the present invention, a resin layer is provided on at least one surface of a base film.

The base film is a semi-aromatic polyamide film that has been at least uniaxially stretched, and includes one that has been biaxially stretched as well.

<Semi-Aromatic Polyamide Film>

The base film constituting the laminated film of the present invention is a semi-aromatic polyamide film. Semi-aromatic polyamides have an excellent balance of mechanical characteristics such as heat resistance and flex resistance, and films formed by stretching semi-aromatic polyamides have transparency.

In the present invention, the semi-aromatic polyamide is one that is constituted from a dicarboxylic acid component and a diamine component and that has an aromatic component in the dicarboxylic acid component or the diamine component.

It is preferable that the dicarboxylic acid component constituting the semi-aromatic polyamide be mainly composed of terephthalic acid, and it is preferable that the proportion of terephthalic acid in the dicarboxylic acid component be 60 to 100 mol %.

Examples of dicarboxylic acid components other than terephthalic acid include aliphatic dicarboxylic acids such as oxalic acid, malonic acid, succinic acid, glutaric acid, adipic acid, sebacic acid, dodecanedioic acid, tetradecanedioic acid, and octadecanedioic acid, as well as aromatic dicarboxylic acids such as 1,4-naphthalenedicarboxylic acid, 1,3-naphthalenedicarboxylic acid, 1,2-naphthalenedicarboxylic acid, and isophthalic acid.

It is preferable that the diamine component constituting the semi-aromatic polyamide be mainly composed of an aliphatic diamine having 4 to 15 carbon atoms. It is preferable that the proportion of the aliphatic diamine having 4 to 15 carbon atoms in the diamine component be 60 to 100 mol %.

Examples of aliphatic diamines having 4 to 15 carbon atoms include 1,4-butanediamine, 1,5-pentanediamine, 1,6-hexanediamine, 1,7-heptanediamine, 1,8-octanediamine, 1,9-nonanediamine, 2-methyl-1,8-octanediamine, 4-methyl-1,8-octanediamine, 1,10-decanediamine, 1,11-undecanediamine, 1,14-tetradecanediamine, and 1,15-pentadecanediamine. They may be used singly, or may be used in combinations of two or more thereof.

As the semi-aromatic polyamide, a semi-aromatic polyamide made of a dicarboxylic acid component consisting solely of terephthalic acid (100 mol % of terephthalic acid) and a diamine component containing 60 to 100 mol % of 1,9-nonanediamine and 2-methyl-1,8-octanediamine in total in the diamine component, and a semi-aromatic polyamide made of a dicarboxylic acid component consisting solely of terephthalic acid (100 mol % of terephthalic acid) and a diamine component containing 1,10-decanediamine are preferable.

In the semi-aromatic polyamide, a lactam such as ε-caprolactam, ξ-enantholactam, η-capryllactam, or ω-laurolactam may be copolymerized, to the extent that the object of the present invention is not impaired.

It is preferable to select the types and copolymerization ratios of the monomers constituting the semi-aromatic polyamide such that the melting point (Tm) of the resulting semi-aromatic polyamide is in the range of 270 to 350° C. In the semi-aromatic polyamide, thermal decomposition during processing into a film can be efficiently suppressed when the Tm is in the aforementioned range. When the Tm is lower than 270° C., the resulting film may have insufficient heat resistance. On the other hand, when the Tm is higher than 350° C., thermal decomposition may occur during film production.

The limiting viscosity of the semi-aromatic polyamide is preferably 0.8 to 2.0 dL/g, and is more preferably 0.9 to 1.8 dL/q. When the semi-aromatic polyamide has a limiting viscosity of 0.8 dL/g or more, it is possible to produce films with excellent mechanical strength, but when the limiting viscosity exceeds 2.0 dL/g, it may be difficult to produce films.

The semi-aromatic polyamide may contain a polymerization catalyst or a terminal capping agent. Examples of the terminal capping agent include acetic acid, lauric acid, benzoic acid, octylamine, cyclohexylamine, and aniline. Also, examples of the polymerization catalyst include phosphoric acid, phosphorous acid, hypophosphorous acid, and salts thereof.

As the semi-aromatic polyamide, commercially available products can be suitably used. Examples of such commercially available products include "Genestar®" manufactured by Kuraray Co., Ltd., "XecoT®" manufactured by Unitika Ltd., "Reny®" manufactured by Mitsubishi Engineering-Plastics Corporation, "Arlen®" manufactured by Mitsui Chemicals, Inc., "Ultramid®" manufactured by BASF SE, and Nylon-MXD6 manufactured by Mitsubishi Gas Chemical Company, Inc.

The semi-aromatic polyamide can be produced using methods known as methods for producing crystalline polyamides. Examples thereof include the following methods: a solution polymerization method or interfacial polymerization method using an acid chloride and a diamine component as raw materials (method A); a method to produce a low grade polymer using a dicarboxylic acid component and a diamine component as raw materials and to make the low grade polymer have a high molecular weight by melt polymerization or solid phase polymerization (method B); a method to produce a crushed mixture of a salt and a low grade polymer using a dicarboxylic acid component and a diamine component as raw materials and to subject it to solid phase polymerization (method C); and a method to produce a salt using a dicarboxylic acid component and a diamine component as raw materials and to subject it to solid phase polymerization (method D). Among them, the method C and the method D are preferable, and the method D is more preferable. Compared to the method B, the method C and the method D can produce the crushed mixture of salt and low grade polymer or the salt at a lower temperature, and do not require a large amount of water when producing the crushed mixture of salt and low grade polymer or the salt. Therefore, generation of gelatinous materials can be reduced, and fish eye can be reduced.

In the method B, for example, a low grade polymer can be obtained by mixing a diamine component, a dicarboxylic acid component, and a polymerization catalyst in a batch to prepare a nylon salt, and then subjecting the nylon salt to thermal polymerization at a temperature of 200 to 250° C. It is preferable that the low grade polymer have a limiting viscosity of 0.1 to 0.6 dL/g. By setting the limiting viscosity of the low grade polymer to this range, there is an advantage that the molar balance between carboxyl groups in the dicarboxylic acid component and amino groups in the diamine component is not disrupted in the subsequent solid phase polymerization or melt polymerization and the polymerization speed can be accelerated. When the low grade polymer has a limiting viscosity of less than 0.1 dL/g, the polymerization time may become longer and the productivity may be inferior. On the other hand, when the limiting viscosity exceeds 0.6 dL/g, the resulting semi-aromatic polyamide may be colored.

The solid phase polymerization of the low grade polymer is preferably carried out under reduced pressure or under inert gas circulation. Also, the temperature of solid phase polymerization is preferably 200 to 280° C. By setting the temperature of solid phase polymerization to this range, coloration or gelation of the resulting semi-aromatic polyamide can be suppressed. When the temperature of solid phase polymerization is lower than 200° C., the polymerization time may become longer, resulting in inferior productivity. On the other hand, when the temperature is higher than 280° C., coloring or gelation may occur in the resulting semi-aromatic polyamide.

The melt polymerization of the low grade polymer is preferably carried out at a temperature of 35° C. or lower. When the polymerization temperature is higher than 350° C., decomposition and thermal degradation of the semi-aromatic polyamide may be accelerated. Therefore, films obtained from such a semi-aromatic polyamide may be inferior in strength and appearance. Note that the melt polymerization described above includes melt polymerization using a melt extruder, as well.

In the method C, for example, a suspension made of an aliphatic diamine in a molten state and a solid aromatic dicarboxylic acid is stirred and mixed to obtain a mixed solution. Then, in this mixed solution, a reaction between the aromatic dicarboxylic acid and the aliphatic diamine to produce a salt and a polymerization reaction of the produced salt to produce a low grade polymer are carried out at a temperature lower than the melting point of the semi-aromatic polyamide that will be produced in the end, thereby obtaining a mixture of salt and low grade polymer. In this case, crushing may be carried out while allowing the reactions to take place, or crushing may be carried out after the mixture is removed once after the reactions. Then, the resulting reaction products are subjected to solid phase polymerization at a temperature lower than the melting point of the semi-aromatic polyamide that will be produced in the end, and are made to have a high molecular weight up to a predetermined molecular weight, thereby obtaining the semi-aromatic polyamide. It is preferable that the solid phase polymerization be carried out at a polymerization temperature of 180 to 270° C. and for a reaction time of 0.5 to 10 hours in an inert gas stream such as nitrogen.

In the method D, for example, aromatic dicarboxylic acid powder is heated in advance to a temperature at or higher than the melting point of the aliphatic diamine and at or lower than the melting point of the aromatic dicarboxylic acid, and to the aromatic dicarboxylic acid powder at this temperature, an aliphatic diamine is added with substantially free of water so as to maintain the powder state of the aromatic dicarboxylic acid, thereby preparing a salt. Then, the resulting salt is subjected to solid phase polymerization at a temperature lower than the melting point of the semi-aromatic polyamide that will be produced in the end, and is made to have a high molecular weight up to a predetermined molecular weight, thereby obtaining the semi-aromatic polyamide. It is preferable that the solid phase polymerization be carried out at a polymerization temperature of 180 to 270° C. and for a reaction time of 0.5 to 10 hours in an inert gas stream such as nitrogen.

In the present invention, the semi-aromatic polyamide film may contain fine particles for the purpose of improving slipperiness and the like. In the semi-aromatic polyamide film, either inorganic fine particles or organic fine particles can be used as the fine particles.

Examples of the inorganic fine particles contained in the semi-aromatic polyamide film may include fine particles of silica, alumina, titanium dioxide, calcium carbonate, kaolin, barium sulfate, and others. In addition, examples of such organic fine particles include acrylic resin particles, melamine resin particles, silicone resin particles, and crosslinked polystyrene particles. Among these, silica fine particles and acrylic resin particles are preferable due to their good dispersibility in the film and handling properties.

The average particle diameter of the fine particles is preferably 0.05 to 5.0 μm, and more preferably 0.1 to 4.0 μm.

The content of the fine particles is preferably 0 to 0.2% by mass, more preferably 0.01 to 0.2% by mass, and even more preferably 0.02 to 0.1% by mass.

Note that the slipperiness of the film can be efficiently improved when the content of fine particles with an average particle diameter of 0.05 to 2.0 μm is 0.2% by mass or less, or when the content of fine particles with an average particle diameter of 2.1 to 5.0 μm is 0.1% by mass or less. Also, fine particles with different average particle diameters may be used in combinations of two or more thereof.

As described above, the average particle diameter and content of the fine particles can be selected in accordance with the frictional characteristics, optical characteristics, and other characteristics required for the film. Although the fine particles can be added to the extent that they do not impair transparency, it is preferable not to add them in order to achieve high transparency.

A variety of methods can be used to make the additive agents described above contained in the film. The following methods are representative examples of such methods:

(A) a method for adding additive agents during polymerization of the semi-aromatic polyamide;

(B) a masterbatch method in which additive agents are directly added to the semi-aromatic polyamide and melt-kneaded pellets are prepared;

(C) a method in which additive agents are directly added to the semi-aromatic polyamide during film production and melt-kneaded in an extruder; and (D) a method in which additive agents are directly added to an extruder and melt-kneaded.

Raw materials of the semi-aromatic polyamide film may be a mixture of virgin raw materials, may be a mixture of substandard films produced during production of the semi-aromatic polyamide film or scraps generated as edge trims, or may be a mixture of the scrap mixture with virgin raw materials. These mixings can be carried out by known methods, such as a method of dry blending using a known device, or a kneading method in which a single-screw or twin-screw extruder is used to melt, knead, and mix the materials.

Besides the fine particles described above, the semi-aromatic polyamide film may contain, as necessary, the following additive agents: a lubricant; a coloring agent such as a pigment including titanium or a dye; an anti-coloring agent; a thermal stabilizer, an antioxidant such as hindered phenol, a phosphate ester, or a phosphite ester; a weatherability modifier such as a benzotriazole compound; a bromine-based or phosphorus-based flame retardant; a plasticizer; a mold release agent; a reinforcing agent such as talc; a modifier; an antistatic agent; an ultraviolet absorber; an anti-fogging agent; and a variety of polymer resins.

The surface of the semi-aromatic polyamide film may be subjected to a corona treatment, a plasma treatment, an acid treatment, a flame treatment, or the like in order to provide good close adhesion with the resin layer.

The semi-aromatic polyamide film can be a monolayer film made of one type of layer, or can have a multilayer structure formed by laminating two or more types of layers. When the multilayer structure is employed, for example, in a film with a two-layer structure, the lubricant can be contained in any one layer of the two layers, and in a film with a three-layer structure, the lubricant can be contained in each of the layers located on both surfaces of the three layers. The type and content of the lubricant to be contained can be designed independently of each other. By employing such a multilayer structure, the surface roughness of each surface of the semi-aromatic polyamide film can be independently controlled.

The semi-aromatic polyamide film preferably has a thickness of 1 to 150 µm, more preferably 10 to 125 µm, and even more preferably 15 to 100 µm. The semi-aromatic polyamide film may lose transparency when the thickness exceeds 150 µm, and may have inferior mechanical strength when the thickness is less than 5 µm.

<Resin Layer>

The resin layer constituting the laminated film of the present invention is an easily-adhesive layer that has been laminated on the base film in advance in order to enhance the adhesiveness with a variety of functional layers that are to be laminated.

(Fine Particles)

In the present invention, it is necessary for the resin layer to contain fine particles. When the resin layer contains fine particles, the coating strength is improved, and furthermore, the adhesiveness with functional layers can be enhanced.

In the present invention, either inorganic fine particles or organic fine particles can be used as the fine particles in the resin layer.

Examples of the inorganic fine particles contained in the resin layer may include fine particles of inorganic compounds such as silica, alumina, titanium dioxide, calcium carbonate, kaolin, barium sulfate, zinc oxide, niobium oxide, neodymium oxide, lanthanum oxide, zirconium oxide, cerium oxide, and magnesium oxide. Also, examples of the organic fine particles may include acrylic particles, melamine particles, silicone particles, polyimide particles, crosslinked polyester particles, crosslinked polystyrene particles, crosslinked polyethylene particles, crosslinked polypropylene particles, silicone particles, nylon particles, polyacrylonitrile particles, benzoguanamine-formaldehyde resin particles, styrene divinylbenzene copolymer particles, and acryl-divinylbenzene copolymer. Among these, silica fine particles and acrylic resin particles are preferable due to their good dispersibility in the resin layer and handling properties.

These inorganic and organic particles can be used singly or in combinations of multiples, and may be subjected to a surface treatment in order to enhance their dispersibility and also to enhance the adhesiveness between the resin layer and the functional layer.

The average particle diameter of the fine particles is preferably 0.010 to 4.0 µm, more preferably 0.030 to 3.0 µm, and even more preferably 0.050 to 2.0 µm. When the average particle diameter of the fine particles is less than 0.010 µm, the dispersibility is not sufficiently improved, and the adhesiveness of the resin layer with the functional layer may not be sufficiently improved. On the other hand, when the average particle diameter of the fine particles exceeds 4.0 µm, the resin layer may lose transparency.

Note that the average particle diameter of the fine particles can be arbitrarily selected in accordance with the frictional characteristics, optical characteristics, blocking resistance, and other characteristics required for the film.

For example, from the viewpoint of frictional characteristics, it is preferable that the average particle diameter be large. Specifically, it is preferably 0.30 µm or more, more preferably 0.40 µm or more, and even more preferably 0.50 µm or more. From the viewpoint of blocking resistance, it is preferable that the average particle diameter be small. Specifically, it is preferably 0.50 µm or less, more preferably 0.30 µm or less, and even more preferably 0.20 µm or less.

The content of the fine particles in the resin layer is preferably 0.1 to 5.0% by mass, more preferably 0.15 to 4.0% by mass, and even more preferably 0.2 to 3.0% by mass. When the content of the fine particles is less than 0.1% by mass, the effects of adding the fine particles are not fully demonstrated, and blocking between the resin layers may not be sufficiently suppressed. On the other hand, when the content of the fine particles exceeds 5.0% by mass, the transparency may be reduced in the resin layer and the adhesiveness with the functional layer may be reduced. When two or more types of fine particles are used in combination, the total amount thereof is preferably 0.1 to 5.0% by mass.

In the present invention, it is preferable for the resin layer to use two or more types of fine particles in combination in order to improve frictional characteristics and to improve blocking resistance, and it is more preferable to use two or more types of fine particles, one with a larger average particle diameter and the other with a smaller average particle diameter. For example, fine particles with a larger average particle diameter preferably have an average particle diameter of 0.3 to 4.0 µm, and more preferably 0.4 to 3.0 sm. Meanwhile, fine particles with a smaller average particle diameter preferably have an average particle diameter of 0.01 to 0.2 µm, and more preferably 0.02 to 0.1 µm. When these fine particles with different average particle diameters are used in combination, it is preferable that 1 to 15 parts by mass of the fine particles with a smaller average particle diameter be used relative to 1 part by mass of the fine particles with a larger average particle diameter, and 3 to 10 parts by mass is more preferable. In the resin layer, by using two or more types of fine particles with different average particle diameters in combination in such a mass relationship, both the frictional characteristics and the blocking resistance can be significantly improved without interfering with the transparency.

The resin layer constituting the laminated film of the present invention has improved close adhesion to the base film and also has improved close adhesion to the fine particles contained in the resin layer. Accordingly, the fine particles contained in the resin layer will not fall out of the resin layer even when their average particle diameter is larger than the thickness of the resin layer.

Note that, when the resin layer contains fine particles, it is preferable that the fine particles not be completely buried in the resin layer, but that a part of or most of the fine particles be exposed outside the resin layer and the fine particles also be in a state where they do not fall out of the resin layer. In this state, the laminated film can ensure good slipperiness even when no lubricant is contained in the semi-aromatic polyamide film, and moreover, the transparency of the semi-aromatic polyamide film is not impaired.

In the present invention, when the laminated film has resin layers laminated on both surfaces of the base film, even if the base film does not contain fine particles, the resin layers laminated on both surfaces have slipperiness, which suppresses the occurrence of blocking and scrapes, and suppresses a reduction in transparency.

Note that a laminated film in which a resin layer is laminated on one surface of the base film and the base film contains a lubricant also has slipperiness on both surfaces. However, since transparency is lost in the base film containing the lubricant, the laminated film having a resin layer laminated on one surface has inferior transparency compared to the laminated film having resin layers laminated on both surfaces, even when they have the same thickness.

The resin constituting the resin layer is not particularly limited, and a variety of resins can be used. Examples of the resins include a polyamide-based resin, a polyurethane-based resin, a polyester-based resin, an acrylic resin, and an epoxy-based resin. Among them, a polyamide-based resin, a polyester-based resin, a polyurethane-based resin, and an acrylic resin are preferable because of their excellent adhesiveness with a variety of functional layers, and furthermore, a polyamide-based resin, a polyurethane-based resin, and an acrylic resin are more preferable from the viewpoint of heat resistance.

(Polyamide-Based Resin)

The polyamide-based resin constituting the resin layer is not particularly limited, and examples thereof include an aliphatic polyamide, an alicyclic polyamide, and an aromatic polyamide. The aromatic polyamide includes a semi-aromatic polyamide and a fully aromatic polyamide (aramid). Note that, from the viewpoint of improving close adhesion with the base film constituted from the semi-aromatic polyamide, the same type of semi-aromatic polyamide can also be used as the resin constituting the resin layer. Among these polyamide-based resins, a dimer acid-based polyamide is preferable from the viewpoint of excellent balance between heat resistance and adhesiveness.

In order to form the resin layer, water dispersions of polyamide-based resins can be used. Examples of commercially available polyamide-based resin aqueous dispersions include Sepolsion PA-150 and PA-200 (manufactured by Sumitomo seika Chemicals Co., Ltd.).

(Polyurethane-Based Resin)

The polyurethane-based resin constituting the resin layer is not particularly limited, and examples thereof include a variety of urethane resins such as a polyester-based urethane resin, a polyether-based urethane resin, and a polycarbonate-based urethane resin. It may be copolymerized with a compound having a sulfo group or a compound having a carboxyl group from the viewpoint of improving the close adhesion with the base film, improving the adhesiveness with the functional layer, or improving the dispersibility in water.

In order to form the resin layer, water dispersions of polyurethane-based resins can be used. Examples of commercially available polyurethane-based resin aqueous dispersions include the Hydran series manufactured by DIC Corporation, the Superflex series manufactured by DKS Co., Ltd., the Takelac series manufactured by Mitsui Chemicals Inc., the Adeka Bontighter series manufactured by Adeka Corporation, and Ucoat manufactured by Sanyo Chemical Ltd.

(Polyester-Based Resin)

The polyester-based resin constituting the resin layer is not particularly limited, and examples thereof include one that is made of a polybasic acid component and a polyhydric alcohol component and is produced by known polymerization methods. A single polyester-based resin may be used, or two or more polyester-based resins may be used in combination.

In order to form the resin layer, water dispersions of polyester-based resins can be used. Examples of commercially available polyester-based resin aqueous dispersions may include elitel KA-5034, KZA-0134, and KZA-3556 (all manufactured by Unitika Ltd.), and Plascoat Z-730 and RZ-142 (both manufactured by Goo Chemical Co., Ltd.).

(Acrylic Resin)

The acrylic resin constituting the resin layer is not particularly limited, and examples thereof include those mainly composed of ethyl acrylate, butyl acrylate, 2-ethylhexyl acrylate, or the like, and copolymerized with a vinyl compound such as styrene, methyl methacrylate, and acrylonitrile, as well as a functional group monomer such as acrylic acid, methacrylic acid, itaconic acid, acrylamide, methylol acrylamide, hydroxyethyl acrylate, hydroxyethyl methacrylate, or the like.

In order to form the resin layer, aqueous dispersions of acrylic resins can be used. Examples of commercially available acrylic resin aqueous dispersions include the Nikasol series (manufactured by Nippon Carbide Industries Co., Inc.), the Nanocryl series and the Liocryl series (both manufactured by Toyochem Co., Ltd.), the Ultrasol series (manufactured by Aica Kogyo Co., Ltd.), and the Voncoat series (manufactured by DIC Corporation).

(Additive Agents)

To the resin layer, the following can be added as necessary to the extent that they do not impair physical properties such as adhesiveness and heat resistance: a variety of agents such as a leveling agent., a defoaming agent, an anti-popping agent, a pigment distributing agent, and an ultraviolet absorber, as well as pigments or dyes such as titanium oxide, zinc oxide, and carbon black.

It is preferable for the resin layer to contain a crosslinking agent in terms of improving adhesiveness to the functional layer. By crosslinking the resin constituting the resin layer with the crosslinking agent, it is possible to obtain a resin layer that exhibits low flowability even when heated to the softening point or higher (low flowability under a high temperature).

As the crosslinking agent, anything can be used as long as it can crosslink the resin constituting the resin layer. For example, a hydrazide compound, an isocyanate compound, a melamine compound, a urea compound, an epoxy compound, a carbodiimide compound, and an oxazoline compound are preferable, and these compounds can be used singly or in a mixture. Among them, an oxazoline compound, a carbodiimide compound, an epoxy compound, and an isocyanate compound are suitable. Besides, one that has self-crosslinking properties or one that has polyvalent coordination sites can also be used as the crosslinking agent.

In the present invention, commercially available crosslinking agents may be used due to their ease of availability. Specifically, the APA series (APA-M950, APAM980, APA-P250, APA-E280, and the like) manufactured by Otsuka Chemical Co., Ltd. can be used as the hydrazide compound. The following can be used as the isocyanate compound: BASONAT PLR8878 and BASONAT HW-100 manufactured by BASF SK; Bayhydur 3100 and Bayhydur VPLS2150/1 manufactured by Sumitomo Bayer Urethane Co., Ltd.; and the like. As the melamine compound, Cymel 325 manufactured by Mitsui Cytec, Ltd. and the like can be used. As the urea compound, the BECKAMINE series manufactured by DIC Corporation and the like can be used. As the epoxy compound, the Denacol series (EM-150, EM-101, and the like) manufactured by Nagase ChemteK Corporation, Adeka Resin EM-0517, EM-0526, EM-051R, and EM-11-50B manufactured by Adeka Corporation, and the like can be used. As the carbodiimide compound, the Carbodilite series (SV-02, V-02, V-02-L2, V-04, E-01, E-02, V-01, V-03, V-07, V-09, and V-05) manufactured by Nisshinbo Chemical Inc. and the like can be used. As the oxazoline compound, the Epocros series (WS-500, WS-700, K-1010E, K-1020E, K-1030E, K-2010E, K-2020E, and K-2030E) manufactured by Nippon Shokubai Co., Ltd. and the like can be used. They are commercially available as dispersions or solutions containing crosslinking agents.

When the resin layer in the present invention contains the crosslinking agent, it is preferable that the crosslinking agent be contained at 0.5 to 50 parts by mass relative to 100 parts by mass of the resin constituting the resin layer. When the content of the crosslinking agent is less than 0.5 parts by mass, it becomes difficult to obtain the desired crosslinking effects in the resin layer, such as low flowability at a high temperature. On the other hand, when the content of the crosslinking agent exceeds 50 parts by mass, as a result of a decrease in the liquid stability and processability of the coating agent for resin layer formation, which will be mentioned later, it may become difficult to obtain the basic performance as the resin layer.

The thickness of the resin layer is preferably 0.03 to 0.5 µm, more preferably 0.04 to 0.4 µm, even more preferably 0.05 to 0.35 µm, and most preferably 0.06 to 0.3 µm. When the thickness of the resin layer is less than 0.03 µm, not only does it become difficult to form a uniform thickness, but also close adhesion with the base film or adhesiveness with the functional layer may not be sufficiently obtained. In addition, there is an increased risk that the fine particles may fall out of the resin layer. When the thickness of the resin layer exceeds 0.5 µm, slipperiness and transparency may be reduced. Also, when a laminated body having a resin layer whose thickness is outside the range described above is rolled, it may not be unwound well from the film roll, and may have inferior blocking resistance.

Note that the thickness of the resin layer can be measured using a variety of methods. For example, mention may be made of a method in which the resin layer is peeled off from the laminated film using a solvent or the like, the mass per unit area of the resin layer is then determined from the difference in mass before and after the peeling, and the thickness is calculated from this and the density of the resin layer, and a method in which the thickness is measured by observing the cross-section of the laminated film in which the resin layer has been formed, using a microscope or the like. In the present invention, the latter, observation of the cross-section, was carried out to measure the thickness of the resin layer. Note that, when the resin layer contains fine particles whose average particle diameter is larger than the thickness of the resin layer, the thickness of the resin layer in the area where the fine particles do not exist was measured.

<Method for Producing Laminated Film>

Next, a method for producing the laminated film will be described.

The laminated film of the present invention is obtained by, for example, laminating the resin layer after obtaining the semi-aromatic polyamide film or in the step of forming the semi-aromatic polyamide film. Examples of the method of lamination include a method of applying solutions of a variety of solvents or an aqueous dispersion of the resin constituting the resin layer and a method of thermally melting the resin and performing extrusion coating. Another method is to form a resin layer on the outermost layer during multilayer extrusion of unstretched sheets of semi-aromatic polyamide film. Regardless of the means described above, any means may be used to provide the resin layer on at least one surface of the semi-aromatic polyamide film, as long as the resin layer is steadily formed on at least one surface of the semi-aromatic polyamide film.

The laminated film of the present invention can be produced by, as described above, applying a coating agent for resin layer formation to at least one surface of the semi-aromatic polyamide film to laminate the resin layer.

Note that the above-mentioned coating agent for resin layer formation shall refer to a resin solution in which the resin constituting the resin layer has been dissolved in a solvent in advance, or to an aqueous dispersion in which the resin has been aqueously dispersed.

Specifically, the method for producing the laminated film include the following steps:
 (a) extruding a semi-aromatic polyamide from a die and cooling with a moving coolant at 30 to 40° C. to produce an unstretched film with a crystallization heat capacity of 20 J/g or more;
 (b) applying a coating agent for resin layer formation to at least one surface of the film made of semi-aromatic polyamide to form a coating film;
 (c) drying the coating film;
 (d) stretching the film in the longitudinal direction at a ratio of 2.0 to 3.5 times and in the width direction at a ratio of 2.0 to 4.0 times;
 (e) subjecting a stretched film to a heat setting treatment at 252° C. to (Tm−5° C.) and to a relaxation treatment with a relaxation rate of 1.0 to 10.0% in the longitudinal direction and 1.0 to 12.0% in the width direction; and
 (f) rolling the stretched film up.

The steps described above may be performed in the order of (a), (b), (c), (d), (e), and (f), or may be performed in the order of (a), (d), (b), (c), (d), (e), and (f) or in the order of (a), (d), (e), (b), (c), and (f).

Hereinafter, each step will be specifically described.
(Unstretched Film)

In step (a), a semi-aromatic polyamide is extruded from a die and cooled with a moving coolant at 30 to 40° C. to produce an unstretched film with a crystallization heat capacity of 20 J/g or more.

That is, the aforementioned semi-aromatic polyamide or one blended with an additive agent and the like is melt-extruded with an extruder, the molten polymer is discharged in a sheet shape from a flat die such as a T-die or I-die, and the sheet is brought into contact with the cooling surface of a moving coolant such as a cooling roll or steel belt and cooled, thereby obtaining an unstretched film.

The extrusion temperature is preferably at the melting point (Tm) of the semi-aromatic polyamide or higher and 370° C. or lower. When the extrusion temperature is at or lower than the melting point of the semi-aromatic polyamide, the viscosity may be increased and extrusion may become impossible. When the extrusion temperature is higher than 370° C., there is a risk that the semi-aromatic polyamide may be decomposed.

The unstretched film of the semi-aromatic polyamide produced in step (a) is required to have a crystallization heat capacity of 20 J/g or more, and preferably 25 J/g or more. When the crystallization heat capacity of the unstretched film is less than 20 J/g, the semi-aromatic polyamide film obtained by biaxially stretching the film is highly crystallized, resulting in a low tensile elongation at break and reduced transparency, and especially when it contains a lubricant such as silica, the haze is high. In addition, when the unstretched film has a crystallization heat capacity of less than 20 J/g, stretching may become unstable, or the film may not be stretched due to frequent cutting, requiring a higher stretching force at the initial stage of stretching, thus making it difficult to obtain a stretched film with a uniform thickness.

An unstretched film of the semi-aromatic polyamide having a crystallization heat capacity of 20 J/g or more can be produced by melting and mixing the semi-aromatic polyamide at a temperature of 280 to 340° C. for 3 to 15 minutes in an extruder, extruding it through a T-die into a sheet shape, and cooling this sheet-shaped product by placing it in close contact with a cooling roll whose temperature is controlled at 30 to 40° C. When the temperature of the cooling roll is higher than 40° C., the resulting unstretched sheet has a crystallization heat capacity of less than 20 J/g, and the problems described above occur after stretching.

As the method for cooling and solidifying the molten polymer while placing it in close contact with the moving coolant in order to uniformly cool and solidify the molten polymer to obtain an unstretched film, methods such as the air knife casting method, the electrostatic application method, and the vacuum chamber method can be used. When the electrostatic application method (electrostatic pinning method, PNC film production) is employed, the applied voltage varies depending on various conditions, but is preferably controlled with an upper limit of 6.5 kV.

By the method described above, a monolayer film made of one type of layer is obtained. However, a film having a multilayer structure can be produced by methods such as the method described above in which the semi-aromatic polyamide constituting each layer is separately molten and extruded, laminated and fused before solidification, and then biaxially stretched and heat set, or a method in which two or more types of layers are separately molten and extruded to form films and both are then laminated and fused together in the unstretched state or after stretching. For simplicity of the process, it is preferable to use a multilayer die and fuse the layers together before solidification.

The resulting unstretched film normally has a thickness of about 10 μm to 3 mm, and has excellent characteristics such as low water absorbency and chemical resistance even as it is, but by biaxial stretching the film (step (d)), low water absorbency, chemical resistance, heat resistance, and mechanical strength are further improved.

From the viewpoint of improving transparency, the temperature of the unstretched film produced in step (a) is preferably kept at 40° C. or lower, more preferably at 35° C. or lower, and even more preferably at 30° C. or lower, until it is stretched.

(Formation of Coating Film)

In step (b), a coating agent for resin layer formation is applied to at least one surface of the semi-aromatic polyamide film to form a coating film. Known methods can be employed as the method for forming a coating film. For example, the following methods can be employed: gravure roll coating, reverse roll coating, wire bar coating, lip coating, air knife coating, curtain flow coating, spray coating, immersion coating, and brush application. By these methods, the coating agent can be uniformly applied to the surface of the semi-aromatic polyamide film.

(Drying of Coating Film)

In step (c), drying of the coating film is carried out. That is, after applying the coating agent for resin layer formation to the semi-aromatic polyamide film to form a coating film, the coating film is subjected to a drying heat treatment, which can remove the aqueous medium, and a semi-aromatic polyamide film having a resin layer made of a dense coating film formed thereon can be obtained.

(Stretched Film)

In step (d), the film is stretched in the longitudinal direction at a ratio of 2.0 to 3.5 times and in the width direction at a ratio of 2.0 to 4.0 times. As a result of this, the unstretched film is biaxially stretched, and the stretching causes the semi-aromatic polyamide to be orientationally crystallized.

As the biaxial stretching method, the flat-type sequential biaxial stretching method, the flat-type simultaneous biaxial stretching method, the tubular method, and the like can be used. Among them, the flat-type simultaneous biaxial stretching method is most suitable because of its good film thickness accuracy and uniform physical properties in the width direction of the film.

As the stretching device for the flat-type simultaneous biaxial stretching method, a screw-type tenter, a pantograph-type tenter, a linear motor-driven clip-type tenter, and the like can be used.

The stretching ratio is required to be 2.0 to 3.5 times in the longitudinal direction and 2.0 to 4.0 times in the width direction in order to obtain excellent heat resistance and mechanical strength of the semi-aromatic polyamide film that is to be finally obtained, and it is preferably 2.0 to 3.0 times in the longitudinal direction and 2.0 to 3.5 times in the width direction.

In the case of sequential biaxial stretching, when the stretching ratio in the longitudinal direction exceeds 3.5 times, the resulting stretched film may become too crystallized, resulting in reduced stretchability in the width direction. Even when stretching in the width direction is possible, the resulting stretched film is likely to have stretching irregularities, resulting in reduced thickness accuracy, a reduced tensile elongation at break in the longitudinal direction, and reduced transparency.

In the sequential biaxial stretching method, the stretching ratio is even more preferably 2.3 to 2.5 times in the longitudinal direction and 3.3 to 3.5 times in the width direction.

Note that, in the description below, the longitudinal direction may be referred to as longitudinal and the width direction as transverse.

In the case of simultaneous biaxial stretching, when the stretching ratio in the longitudinal direction exceeds 3.5 times, the resulting stretched film may have a higher thermal shrinkage factor and reduced dimensional stability. Meanwhile, when the stretching ratio in the width direction exceeds 4.0 times, the thermal shrinkage factor may be increased, the dimensional stability may be reduced, and the tensile elongation at break may also be reduced.

In the simultaneous biaxial stretching method, in order to obtain a biaxially stretched film with a thickness of 1 μm or more and 25 μm or less, the stretching ratio is preferably 2.5 to 3.0 times in the longitudinal direction and 2.5 to 3.3 times in the width direction, and in order to obtain a biaxially stretched film with a thickness of greater than 25 μm and 50 μm or less, the stretching ratio is preferably 3.0 to 3.5 times in the longitudinal direction and 2.8 to 3.3 times in the width direction.

When the stretching ratio is less than 2.0 times in both the longitudinal direction and the width direction, the resulting stretched film is likely to have stretching irregularities, which may result in thickness irregularities or reduced flatness.

In the present invention, since the crystallization heat capacity of the unstretched film is 20 J/g or more, even at a stretching ratio higher than conventional ones, for example, 2.8 times in the longitudinal direction and 3.5 times in the width direction, it is possible to reduce the stretching stress during stretching and to stretch the film at a higher ratio while maintaining the transparency.

Also, fine particles are normally added to the semi-aromatic polyamide film used as the base film to ensure slipperiness. However, when stretched at a high ratio, separation between the semi-aromatic polyamide and the fine particles occurs in the obtained film, resulting in voids in the film and reduced transparency. In the present invention, since the resin layer, which is laminated on the semi-aromatic polyamide film, contains fine particles, the content of fine particles in the semi-aromatic polyamide film can be reduced without impairing slipperiness, thereby suppressing generation of voids even when the film is stretched at a high ratio. Accordingly, the laminated film obtained in the present invention eliminates the concern of reduced transparency.

Note that, in the case of sequential biaxial stretching, it is important to strictly control the peripheral speed between each of the longitudinal stretching rolls. Normally, each roll is directly driven, but when there is a disturbance in the control between the rolls, such as occurrence of unnecessary tension between the rolls, slippage occurs between the unstretched film and the roll surfaces, causing scrapes. In addition, in the case of longitudinal stretching, dimensional changes in the unstretched film also occur as a result of roll heating, and therefore, it is important to strictly control the peripheral speed of each roll to maintain a balance in tension.

As for the stretching speed, both the stretching strain rates in the longitudinal direction and in the width direction are preferably greater than 400%/min, are more preferably 800 to 12000*/min, and are even more preferably 1200 to 6000/min. When the strain rate is 400%/min or less, crystals grow during stretching and the film may be broken. On the other hand, when the strain rate is too fast, the unstretched film may not be able to follow the deformation and may be broken.

The stretching temperature is preferably at or higher than the glass transition temperature (Tg) of the semi-aromatic polyamide, and is more preferably higher than the Tg and at or lower than (Tg+50° C.). When the stretching temperature is lower than the Tg, breakage of the film is likely to occur and stable production cannot be carried out. On the other hand, when the stretching temperature is higher than (Tg+50° C.), stretching irregularities may occur in the film.

In the present invention, when polyamide 9T (glass transition temperature of 130° C.) is used as the semi-aromatic polyamide, for example, the stretching temperature is preferably 120 to 170° C., more preferably 130 to 160° C., and even more preferably 135 to 155° C.

Note that, prior to stretching, it is preferable to preheat the unstretched film.

In the case of the simultaneous biaxial stretching method, the preheating temperature (atmospheric setting temperature) is preferably 135 to 160° C., and more preferably 140 to 155° C. In the case of the sequential biaxial stretching method, the preheating temperature for longitudinal stretching is preferably 120 to 140° C., and more preferably 125 to 135° C. Also, the preheating temperature for transverse stretching is preferably 105 to 130° C., and more preferably 110 to 120° C. Preheating in the temperature range described above allows for stretching in the stretching step while suppressing crystallization of the semi-aromatic polyamide resin.

In the present invention, the aforementioned preheating temperature and the stretching at the stretching temperature can provide a stretched film with enhanced transparency while reducing the stretching force during film stretching and also suppressing oriented crystals.

(Heat Setting Treatment and Relaxation Treatment)

In step (e), the stretched film is subjected to a heat setting treatment at 252° C. to (Tm−5° C.) and to a relaxation treatment with a relaxation rate of 1.0 to 10.0% in the longitudinal direction and 1.0 to 12.0% in the width direction. That is, after the semi-aromatic polyamide film has been stretched as described above, a heat setting treatment is carried out while gripping the film with the clips used during the stretching. By carrying out the heat setting treatment, the thermal shrinkage factor of the resulting film can be reduced without occurrence of thermal damage irregularities.

The temperature of the heat setting treatment is preferably 260 to 280° C., more preferably 263 to 278° C., and even more preferably 265 to 275° C. When the temperature of the heat setting treatment is lower than 260° C., the resulting film has a high thermal shrinkage factor. When the temperature of the heat setting treatment is higher than 280° C., the resulting film has a reduced tensile elongation at break, is prone to poor appearance due to thermal damage wrinkles, and is in some cases broken during the heat setting treatment, making it difficult to obtain a biaxially stretched film.

In the sequential biaxial stretching method, the temperature of the heat setting treatment is preferably 260 to 275° C. In the simultaneous biaxial stretching method, in order to obtain a biaxially stretched film with a thickness of 1 μm or more and 25 μm or less, the temperature of the heat setting treatment is preferably 260 to 280° C., and in order to obtain a biaxially stretched film with a thickness of greater than 25 μm and 50 μm or less, the temperature of the heat setting treatment is preferably 260 to 275° C.

Examples of the heat setting treatment method include known methods such as blowing hot air, irradiating with infrared rays, and irradiating with microwaves. Among the above methods, the method of blowing hot air is preferable because it allows for uniform and accurate heating.

Furthermore, after carrying out the heat setting treatment, a relaxation treatment is carried out with a relaxation rate of 1.0 to 1.0.0% in the longitudinal direction and 1.0 to 12.0% in the width direction, while still gripping the film with the clips. It is preferable that the relaxation rate be 3 to 10%. By carrying out the relaxation treatment, sufficient dimensional stability can be obtained in the film.

Note that, in the present invention, carrying out the relaxation treatment after carrying out the heat setting treatment is important for improving transparency and for improving adhesiveness with a variety of functional layers. That is, by carrying out the relaxation treatment, not only can the thermal shrinkage factor and dimensional changes due to moisture absorption be reduced, but also the stretching stress during stretching at a high ratio can be reduced, accompanied by an improvement in the thickness accuracy of the stretched film, and the uniformity of the coating film thickness of the resin layer to be formed can be achieved. The improved thickness accuracy of the resin layer can stabilize the adhesive strength when laminated with a variety of functional layers, and can also suppress deformation as the laminated body, such as warpage and curl.

The film of the present invention can be produced by: setting the conditions for crystallization heat capacity of the unstretched film, stretching ratio, heat fixation treatment, relaxation treatment, and other conditions as described above; using an unstretched film with a crystallization heat capacity of 20 J/g or more in the step of biaxially stretching an unstretched film of the semi-aromatic polyamide; stretching it in the longitudinal direction at a ratio of 2.0 to 3.5 times and in the width direction at a ratio of 2.0 to 4.0 times; and subjecting the film that has been biaxially stretched to a heat setting treatment at 252° C. to (Tm−5° C.) and to a relaxation treatment with a relaxation rate of 1.0 to 10.0% in the longitudinal direction and 1.0 to 1.2.0% in the width direction.

(Rolling-Up)

In step (f), the stretched film, which has been stretched and then subjected to the heat setting treatment and relaxation treatment, is cooled and rolled up. The roll of the rolled-up stretched film can be slit to the desired width.

Note that, even in the step where the stretched film that has undergone the heat setting treatment and relaxation treatment in the stretching machine is cooled after leaving the stretching machine and is then rolled up, if excessive tension is applied to the film to roll it up, scrapes may occur. However, in a stretched film having resin layers on both surfaces, scrapes do not occur and the film can be rolled while maintaining transparency. In addition, since the film roll thus obtained also has improved blocking resistance, blocking of the resin layer/base film or resin layer/resin layer during film unwinding is suppressed, which reduces problems that impair transparency, such as roughness of the resin layer surface, and separation of the resin layer.

(Others)

It is preferable that the above-described method for producing the laminated film be carried out by the in-line coating method. That is, it is preferable that the laminated film be produced by performing the steps described above in the order of (a), (b), (c), (d), (e), and (f), in the order of (a), (d), (b), (c), (d), (e), and (f), or in the order of (a), (d), (e), (b), (c), and (f).

In the case of off-line coating, where a film made of semi-aromatic polyamide is rolled up once and then a coating agent for resin layer formation is applied, in order to obtain a film that is excellent in transparency, it is preferable for the film made of semi-aromatic polyamide not to contain a lubricant. However, in the film not containing a lubricant, blocking and scrapes due to rolling-up are more likely to occur, resulting in reduced quality of the film.

As described above, in the method for producing a laminated film of the present invention, the coating agent for resin layer formation is applied to the semi-aromatic polyamide film at an arbitrary stage of the production step using an unstretched film, at an arbitrary stage of the production step using a uniaxially stretched film formed by orienting an unstretched film in either the longitudinal direction or the transverse direction, or at an arbitrary stage of the production step using a biaxially stretched film formed by sequential biaxial stretching or simultaneous biaxial stretching of an unstretched film until it is rolled up with a winding roll. In detail, the laminated film is produced by the following methods: a method in which the coating agent for resin layer formation is applied to the semi-aromatic polyamide film, and then dried as it is to simultaneously carry out the steps of coating film formation treatment, stretching, and heat treatment; a method in which the coating agent is applied to the semi-aromatic polyamide film, and then dried by hot air blowing with a dryer, infrared irradiation, or the like to carry out the steps of coating film formation treatment, stretching, and heat treatment; and a method in which the coating agent is applied after performing the steps of stretching and heat treatment, and then dried by hot air blowing with a dryer, infrared irradiation, or the like to perform a coating film formation treatment.

In the case where the coating agent is applied to form a coating film before biaxial stretching, the resin layer can be applied while the degree of orientational crystallization on the surface of the semi-aromatic polyamide film is small, thus improving the force of close adhesion between the semi-aromatic polyamide film and the resin layer.

On the other hand, in the case where the coating agent is applied after the steps of stretching and heat treatment, the thickness accuracy of the film is made better by stretching, and thus, the application can be performed more precisely compared to the case where the coating agent is applied before stretching, and the risk of cutting or uneven stretching during the stretching step can be further reduced.

In this way, by applying the coating agent for resin layer formation during the production steps of semi-aromatic polyamide film, not only can the production steps be simplified compared to off-line application, but it is also more advantageous in terms of cost due to the thinner film of resin layer.

Furthermore, even when the thickness of the resin layer becomes thinner than the average particle diameter of fine particles contained in the resin layer, the fine particles do not fall out of the resin layer and can contribute to the improvement in slipperiness of the semi-aromatic polyamide film.

<Physical Properties of Laminated Film>

In the laminated film of the present invention, the thermal shrinkage factor in the longitudinal direction $S_{MD}$ and the thermal shrinkage factor in the width direction $S_{TD}$ of the film when treated under conditions of 250° C.×5 min are each required to be −1.0 to 1.5, and they are preferably −0.8 to 1.3%, and more preferably −0.6 to 1.0%.

When the thermal shrinkage factor is 1.54% or less, the laminated film has improved dimensional stability and excellent heat resistance. On the other hand, when the thermal shrinkage factor of the laminated film exceeds 1.5% dimensional changes when processed at a high temperature become significant, resulting in processing troubles, which are problematic.

In the laminated film of the present invention, the absolute value of the difference between the thermal shrinkage factor in the longitudinal direction $S_{MD}$ and the thermal shrinkage factor in the width direction $S_{TD}$, ($|S_{MD}-S_{TD}|$), when treated under conditions of 250° C.×5 min is preferably less than 1.2, more preferably less than 1.1, and even more preferably less than 1.0. When the $|S_{MD}-S_{TD}|$ is less than 1.2 in the laminated film, the thermal shrinkage factors in the longitudinal direction and in the width direction are even and the anisotropy is mitigated. Therefore, even when heat is provided to the film through processing such as reflow soldering or lamination with other materials, occurrence of strain and warping can be suppressed.

In the laminated film of the present invention, the tensile elongations at break in the longitudinal direction and in the width direction, measured in accordance with JIS K7127, are each required to be 70% or more, and they are preferably 70 to 150%, and more preferably 80 to 140%. When the tensile elongations at break are 70% or more, the laminated film has excellent deformation followability, and is thus not broken by external stresses and is deformable. On the other hand, when the tensile elongations at break are less than 70%[1], the laminated film cannot follow the external stresses and is broken. In the laminated film of the present invention, the elongations at break in the longitudinal direction and in the width direction are not necessarily required to be even, and as long as the aforementioned preferred numerical range of tensile elongations at break is satisfied, such as a tensile elongation at break in the longitudinal direction of 140% and a tensile elongation at break in the width direction of 80%, or a tensile elongation at break in the longitudinal direction of 80% and a tensile elongation at break in the width direction of 140%, even an unbalanced relationship is acceptable.

In the laminated film of the present invention, the haze measured in accordance with JIS K7136 is required to be 3% or less, and it is preferably 2.5% or less, more preferably 21 or less, even more preferably 1.5%1 or less, and most preferably 1.0% or less. When the haze exceeds 3%, the laminated film lacks transparency for use in optical applications.

Normally, for biaxially stretched films, the transparency can be enhanced along with toughness by carrying out a stretching operation. For example, in biaxially stretched films containing fine particles, transparency can be ensured while obtaining predetermined characteristics by optimizing the particle diameter and content of the fine particles used. However, when a high degree of transparency as used in optical applications is required, there are limitations in seeking a further improvement in transparency by applying such existing technologies.

In addition, semi-aromatic polyamides are polyamide resins with high crystallinity among polyamides. When such polyamide resins with high crystallinity are subjected to a stretching operation, they tend to have oriented crystals due to their high crystallinity, and thus there is also an operational challenge of performing stretching while suppressing crystallization during stretching and also without losing transparency.

In the present invention, the laminated film using the semi-aromatic polyamide resin, which has an excellent balance of mechanical properties such as heat resistance and flex resistance, as the base material is made to have a haze of 3% or less for use in optical applications. To achieve this, in the present invention, the particle diameter and content of the contained fine particles are adjusted, and a variety of conditions for obtaining a biaxially stretched film are also taken into consideration, thereby obtaining a semi-aromatic polyamide film whose transparency is highly improved, with a haze of 3% or less, for the first time.

In the laminated film of the present invention, the elongation by moisture absorption in the longitudinal direction $N_{MD}$ and the elongation by moisture absorption in the width direction $N_{TD}$ when treated under conditions of 20° C.×90%. RH are each preferably 1% or less, more preferably 0.8 or less, and even more preferably 0.57 or less.

Also, the absolute value of the difference between the elongation by moisture absorption in the longitudinal direction $N_{MD}$ and the elongation by moisture absorption in the width direction $N_{TD}$, ($|N_{MD}-N_{TD}|$), when treated under conditions of 20° C.×90% RH is preferably less than 0.3, more preferably less than 0.2, and even more preferably less than 0.1. When the $|N_{MD}-N_{TD}|$ is less than 0.3 in the laminated film, the elongations under moisture absorption conditions in the longitudinal direction and in the width direction are even, and occurrence of strain and warpage can be suppressed.

In the present invention, when the laminated film is treated under conditions of 250° C.×5 min and the thermal shrinkage factor in the longitudinal direction $S_{MD}$ and the thermal shrinkage factor in the width direction $S_{TD}$ of the film are within a predetermined range, dimensional stability can be enhanced when the film is subjected to thermal history during film processing or the like. In addition to this, when the laminated film of the present invention has elongations by moisture absorption in the above-described range, dimensional changes due to moisture can be suppressed during film processing or the like. That is, dimensional stability when the film absorbs moisture can be enhanced, which not only enhances dimensional accuracy in positioning for laminating other materials and in punching, but also reduces concerns about occurrence of curl and strain after laminating other materials.

The laminated film of the present invention is excellent in close adhesion between the base film and the resin layer, and the close adhesion measured by the cross-cut method described in JIS K 5600, which is indicated as the proportion of the resin layer lattice remaining on the base film, is preferably 95% or more, more preferably 96% or more, and even more preferably 97%.

Also, since the laminated film of the present invention has the resin layer, which contains fine particles, laminated therein, it is excellent in scratch resistance, and the dynamic friction coefficient on the surface of the resin layer under an atmosphere of 23° C.×50% RH is preferably 0.7 or less, more preferably 0.6 or less, and even more preferably 0.5 or less. When the dynamic friction coefficient is 0.7 or more, scratch resistance is improved. Note that the friction coefficient of the resin layer can be controlled by appropriately adjusting the particle diameter, content, and the like of the contained fine particles, or, if several types of fine particles are used in combination, the particle size distribution of the fine particles resulting from the combination, and it can be made lower than that of the base film.

<Functional Layer>

Since the laminated film of the present invention has transparency, a reduced thermal shrinkage factor, an improved tensile elongation at break, slipperiness, and high close adhesion between the semi-aromatic polyamide film and the resin layer, it can be used as a single-sided adhesive film for adherence to the functional layer or as a double-sided adhesive film for adherence between the functional layers, and can be used to produce laminated bodies in which the semi-aromatic polyamide film and the functional layer are adhered.

In particular, for a laminated film having resin layers formed on both surfaces of the laminated film (double-sided resin layer-formed film), when the resin layers contain predetermined fine particles, occurrence of scrapes due to rubbing against rolls can be suppressed in conveyance during the production steps for the laminated film, and also in conveyance during the steps for laminating the functional layers. Accordingly, the laminated body having functional layers laminated therein has few scrapes, has the transparency that the laminated film originally has, and is of sufficiently improved quality.

The method for providing a functional layer on the resin layer surface of the laminated film of the present invention is not particularly limited, but examples of such methods include: a method of application to the resin layer surface, a method of vapor deposition, a method of extruding a molten product and laminating it together, a method of laminating a functional layer provided on a release film to the laminated film and heat pressing them, and then transferring the functional layer to the laminated film.

A functional layer that is to be laminated on the resin layer surface of the laminated film of the present invention is not particularly limited, and examples thereof include functional layers such as a hard coat layer, a conductive layer, a sticky layer, a barrier layer, an antireflection layer, an antiglare layer, a polarizing layer, an antifouling layer, a release layer, an antistatic layer, a hydrophilic layer, a water repellent layer, an oil repellent layer, an ultraviolet absorbing layer, an infrared absorbing layer, a shock absorbing layer, a sealing layer, an insulating layer, a light emitting layer, a printing layer, and an adhesive layer.

In the present invention, the functional layer can be suitably used in applications that take advantage of the transparency of the laminated film in particular, and examples of such a functional layer include a hard coat layer, a conductive layer, a sticky layer, a barrier layer, an antireflection layer, an antiglare layer, and a polarizing layer. These functional layers will be described in detail below.

(Hard Coat Layer)

As the hard coat layer, known hard coat layers can be used, and it is preferable to laminate a layer mainly constituted from a curable resin having chemical resistance and/or scratch resistance. Examples of the curable resin include an ionizing radiation curable resin, a thermosetting resin, and a thermoplastic resin. The ionizing radiation curable resin is preferable because it is easy to perform a layer formation operation on the semi-aromatic polyamide film provided with the resin layer, and it is easy to increase the surface hardness to the desired value.

Specific examples of the curable resin used to form the hard coat layer include an acrylic resin, a silicone-based resin, a melamine-based resin, an epoxy-based resin, and a urethane-based resin. From the viewpoint of hardness, reduction in interference fringes, and close adhesion between the hard coating layer and the base film, an acrylic resin and a silicone-based resin are preferable, and an acrylic resin is more preferable.

As the acrylic resin, one having acrylate-based functional groups such as acryloyl groups and methacryloyl groups is preferable, and polyester acrylate or urethane acrylate is particularly preferable. The polyester acrylate may be obtained by (meth)acrylating an oligomer of a polyester-based polyol. The urethane acrylate may be obtained by (meth)acrylating a urethane-based oligomer made of a polyol compound and a polyisocyanate compound.

Note that examples of monomers for the (meth)acrylation described above include methyl (meth)acrylate, ethyl (meth)acrylate, butyl (meth)acrylate, 2-ethylhexyl (meth)acrylate, methoxyethyl (meth)acrylate, butoxyethyl (meth)acrylate, and phenyl (meth)acrylate.

As the oligomer of polyester-based polyol constituting the polyester acrylate, mention may be made of the following: a condensation product (for example, polyadipate triol) of an aliphatic dicarboxylic acid such as adipic acid and a glycol (for example, ethylene glycol, polyethylene glycol, propylene glycol, polypropylene glycol, butylene glycol, polybutylene glycol) and/or a triol (for example, glycerin, trimethylolpropane), and a condensation product (for example, polysebacate polyol) of an aliphatic dicarboxylic acid such as sebacic acid and a glycol (specific examples are the same as those described above) and/or a triol (specific examples are the same as those described above). Note that some or all of the aliphatic dicarboxylic acid described above may be replaced with another organic acid. In this case, as another organic acid, isophthalic acid, terephthalic acid, or phthalic anhydride is preferable because it exhibits a high degree of hardness in the hard coating layer.

Examples of the urethane-based oligomer constituting the urethane acrylate include a condensation product of a polyisocyanate compound and a polyol compound.

Specific examples of the polyisocyanate compound may include methylene-bis(p-phenylene diisocyanate), hexamethylene diisocyanate-hexanetriol adduct, hexamethylene diisocyanate, tolylene diisocyanate, tolylene diisocyanate trimethylolpropane adduct, 1,5-naphthylene diisocyanate, thiopropyl diisocyanate, ethylbenzene-2,4-diisocyanate, 2,4-tolylene diisocyanate dimer, hydrogenated xylylene diisocyanate, and tris(4-phenylisocyanate)thiophosphate.

Specific examples of the polyol compound may include a polyether-based polyol such as polyoxytetramethylene glycol, a polyester-based polyol such as polyadipate polyol and polycarbonate polyol, and a copolymer of an acrylic ester and hydroxyethyl methacrylate.

To further enhance the hardness of the hard coat layer, along with the polyester acrylate or urethane acrylate, a multifunctional monomer can be used in combination. Specific examples of the multifunctional monomer include trimethylolpropane tri(meth)acrylate, hexanediol di(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the ionizing radiation curable resin described above is used as an ultraviolet curable resin, it is preferable to mix in the resin an acetophenone, a benzophenone, Michler's benzoyl benzoate, an α-amyloxime ester, a thioxanthone, or the like as a photopolymerization initiator, and n-butylamine, triethylamine, tri-n-butylphosphine, or the like as a photosensitizer for use.

The urethane acrylate is preferable from the viewpoint that the hard coat layer is highly elastic and flexible, and has excellent processability (foldability). The polyester acrylate is preferable from the viewpoint that a hard coat layer with extremely high hardness can be formed by selecting the constitutional components of the polyester. Therefore, in order to achieve both high hardness and flexibility, two or more types of acrylates may be used.

The acrylic resin is available as a commercial product, and for example, the following can be used: the SEIKA-BEAM series manufactured by Dainichiseika Color & Chemicals Mfg. Co., Ltd.; the Opstar series manufactured by JSR Corporation; the UV curable hard coat agent SHIKOH series manufactured by The Nippon Synthetic Chemical Industry Co., Ltd.; the UV curable hard coat agents HR320 series, HR330 series, HR350 series, and HR360 series manufactured by The Yokohama Rubber Co., Ltd.; the UV curable functional hard coat agent LIODURAS-LCH series and the like manufactured by TOYO INK CO., LTD.; and the UV coat: agent AICAAITRON series and the like manufactured by Aica Kogyo Co., Ltd. The acrylic resin may be used singly, or may be used in a mixture of multiples.

The silicone-based resin may be one in which acrylic groups are bonded onto a silicone resin via covalent bonds, or it may be one including a condensation product having silanol groups obtained by subjecting an alkoxysilane to hydrolysis polycondensation. In particular, in the latter case, the silanol groups are converted into siloxane bonds by thermal curing or the like after application, and a hard coating layer is obtained as the cured film.

The silicone-based resin is available as a commercial product, and for example, the following can be used: the UV curable silicone hard coat agent X-12 series manufactured by Shin-Etsu Chemical Co., Ltd.; the UV curable silicone hard coat agent UVHC series and the thermosetting silicone hard coat agent SHC series manufactured by Momentive Performance Materials Japan, Inc.; and the IV curable functional hard coat agent LIPDIRAS-S Series and the like manufactured by TOYO INK CO., LTD. The silicone-based resin may be used singly, or may be used in a mixture of multiples.

The pencil hardness of the hard coat layer may be various hardnesses depending on applications, and it is preferably HB or higher, more preferably H or higher, and even more preferably 2H or higher. By having the hard coat layer, the base film has improved scratch resistance. By selecting the thickness, materials, and curing conditions for the hard coat layer, the hardness can be controlled.

Although the thickness of the hard coat layer is not particularly limited, it is preferable to adjust it within a range that does not impair optical characteristics, and it is preferably in the range of 1 to 15 µm, and is more preferably 2 to 5 µm. When the thickness is less than 1 µm, sufficient surface hardness may not be obtained, and when the thickness is 15 µm or more, not only may the laminated film be curled, but it is also not preferable from an economic viewpoint.

Hard coat films are required to have excellent transparency in a variety of applications, including large displays such as TVs and small displays such as cell phones, PCs, and smart phones. Normally, the transparency of a film is expressed in terms of haze and total light transmittance. The hard coat film, in which the hard coat layer described above is laminated on the laminated film of the present invention, preferably has a haze of 3.0% or less, more preferably 2.0% or less, and even more preferably 1.5% or less, and it preferably has a total light transmittance of 80% or more, more preferably 85%, and even more preferably 90% or more.

As the method for forming the hard coat layer, mention may be made of a method in which a coating liquid for hard coat layer formation is applied onto the resin layer laminated on the semi-aromatic polyamide film and cured.

The coating liquid for hard coat layer formation normally contains the aforementioned curable resin, and it may contain additive agents such as an ultraviolet absorber, a leveling agent, a defoaming agent, and an antioxidant, if desired. As the coating liquid for hard coat layer formation, monomers or oligomers for forming the aforementioned curable resin dissolved in a solvent or dispersed in water may be used, or liquid monomers or oligomers may be used as they are.

Examples of the organic solvent in which monomers and/or oligomers for forming the curable resin are to be dissolved include: alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol; ketones such as methyl ethyl ketone, methyl isobutyl ketone, ethyl butyl ketone, cyclohexanone, and isophorone; ethers such as tetrahydrofuran and dioxane; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate, and dimethyl carbonate; a glycol derivative such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether, and propylene glycol methyl ether acetate; and furthermore, 3-methoxy-3-methylbutanol, 3-methoxybutanol, acetonitrile, dimethylformamide, dimethylacetamide, diacetone alcohol, ethyl acetoacetate, toluene, xylene, and cyclohexane. If necessary, a mixture of these organic solvents may be used.

As the method for applying the coating liquid for hard coat layer formation to the resin layer, known methods can be employed. For example, the following methods can be employed: gravure roll coating, reverse roll coating, wire bar coating, lip coating, air knife coating, curtain flow coating, spray coating, immersion coating, and brush application. By these methods, the coating liquid can be uniformly applied to the surface of the resin layer.

After applying the coating liquid for hard coat layer formation to the resin layer, a method of irradiating it with ionizing radiation such as ultraviolet light, a method of heating it, or the like can be employed depending on the type of curable resin, thereby sufficiently curing the coating liquid, and a hard coat layer can be formed on the resin layer laminated on the semi-aromatic polyamide film.

(Conductive Layer)

As the conductive layer, those known can be used, and it is preferable to laminate a layer mainly constituted from a material including a conductive material such as a conductive fibrous filler, a conductive metal oxide, and a conductive polymer.

It is preferable that the conductive fibrous filler be at least one type selected from, for example, a conductive carbon fiber, a metallic fiber, and a metal-coated synthetic fiber.

Examples of the conductive carbon fiber include a vapor grown carbon fiber (VGCF), a carbon nanotube, a wire cup, and a wire wall. Two or more types of these conductive carbon fibers may be used.

As the metallic fiber, for example, fibers made by the drawing method, which stretches stainless steel, iron, gold, silver, copper, aluminum, nickel, titanium, and the like into a thin and long form, or by the cutting method can be used. Such metallic fibers may be used in two or more types, and alloyed ones may be used. Among these metallic fibers, metallic fibers using silver are preferable because of their excellent conductivity.

Examples of the metal-coated synthetic fiber include a fiber formed by coating an acrylic fiber with gold, silver, aluminum, nickel, titanium, or the like. Such metal-coated synthetic fibers may be used in two or more types. Among these metal-coated synthetic fibers, metal-coated synthetic fibers using silver are preferable because of their excellent conductivity.

The content of the conductive fibrous filler in the conductive layer is, for example, preferably 20 to 3000 parts by mass relative to 100 parts by mass of the resin component constituting the conductive layer, and more preferably 50 to 1000 parts by mass. When the content is less than 20 parts by mass, it may not be possible to form a conductive layer having sufficient conductive performance. In addition, the amount of binder resin entering the contact points of the conductive fibrous filler may be increased, which may reduce conduction in the conductive layer and prevent sufficient conductivity from being obtained. When the content exceeds 3000 parts by mass, the haze of the laminated body may become high or the light transmittance performance may become insufficient.

The components of the conductive polymer are not particularly limited, and conventionally known materials can be used, and for example, the following high molecular weight conductive agents can also be used: an aromatic conjugated poly(para-phenylene); a heterocyclic conjugated polypyrrole; a polythiophene; an aliphatic conjugated polyacetylene; a heteroatom-containing conjugated polyaniline; a mixed conjugated poly(phenylenevinylene); a multi-chain conjugated system, which is a conjugated system with multiple conjugated chains in the molecule; and a conductive composite that is a polymer in which the aforementioned conjugated polymer chains are grafted or block copolymerized onto a saturated polymer.

The conductive metal oxide is not particularly limited, and conventionally known materials can be used. Examples thereof may include ZnO, $CeO_2$, $Sb_2O_3$, $SnO_2$, indium tin oxide (abbreviation: ITO), $In_2O_3$, $Al_2O_3$, antimony doped tin oxide (abbreviation: ATO), and aluminum doped zinc oxide (abbreviation: AZO). It is preferable that the average particle diameter of the conductive metal oxide be 0.1 nm to 0.1 μm. When the average particle diameter is within such a range, it is possible to obtain a composition that can form a highly transparent film with almost no haze and good total light transmittance when the conductive fine particles described above are dispersed in the raw materials for the resin component constituting the conductive layer. The content of the conductive fine particles is preferably 10 to 400 parts by mass relative to 100 parts by mass of the resin component constituting the conductive layer described above. When the content is less than 10 parts by mass, it may not be possible to form a conductive layer having sufficient conductive performance, and when the content exceeds 400 parts by mass, the haze of the laminated body may become high or the light transmittance performance may become insufficient.

Also, conductive agents other than the conductive materials described above may be used, and examples thereof include: quaternary ammonium salts; pyridinium salts; a variety of cationic compounds having cationic groups such as primary to tertiary amino groups; anionic compounds having anionic groups such as conjugate base of sulfonic acid, conjugate base of sulfuric acid ester, conjugate base of phosphoric acid ester, or conjugate base of phosphonic acid; amino acid-based, amino sulfuric acid ester-based, or other amphoteric compounds; aminoalcohol-based, glycerin-based, polyethylene glycol-based, or other nonionic compounds; organometallic compounds such as alkoxides of tin and titanium, and metal chelate compounds such as their acetylacetonate salts; compounds obtained by making the compounds listed above have high molecular weights; and polymerizable compounds such as monomers or oligomers that have tertiary amino groups, quaternary ammonium groups, or metal chelate moieties and can be polymerized by ionizing radiation, or organometallic compounds that have polymerizable functional groups that can be polymerized by ionizing radiation and are like coupling agents.

Examples of the method for forming the conductive layer include a method in which the conductive layer is laminated by a normal coating method; a method in which an overcoat layer is further laminated on top of the conductive layer at a level that provides the desired resistance value; a method having a transfer step in which a transfer film having at least the conductive layer described above on a release film is used to transfer the conductive layer described above onto the resin layer, which is the transfer object; physical vapor deposition (PVD); chemical vapor deposition (CVD); and sputtering.

(Sticky Layer)

As the sticker constituting the sticky layer, it is possible to use known stickers including those with excellent transparency called OCAs (Optical Clear Adhesives), which are normally used when laminating members for displays, and examples thereof include an acrylic sticker, a rubber-based sticker, a silicone-based sticker, and a urethane-based sticker. From the viewpoint of heat resistance, transparency, and stability, the acrylic sticker is preferable. As the components used in the acrylic sticker, those known can be used, and examples thereof include 2-ethylhexyl acrylate, butyl acrylate, methyl methacrylate, ethyl acrylate, methyl acrylate, benzyl acrylate, phenoxyethyl acrylate, vinyl acetate, acrylic acid, hydroxyethyl methacrylate, hydroxyethyl acrylate, glycidyl methacrylate, and acetoacetoxyethyl methacrylate. Such components may be copolymerized or mixed for use in accordance with the desired tack or heat characteristics.

To the sticker described above, additive agents such as a crosslinking agent, a tackifier, a filler, a surfactant, a pigment, an antioxidant, a flame retardant, and a silane coupling agent may be blended.

From the viewpoint of improvement in cohesive strength, improvement in heat resistance, and the like, it is preferable to use the crosslinking agent, and conventionally known crosslinking agents can be used.

Examples thereof include an isocyanate compound, an epoxy compound, a metal chelate-based compound, and a melamine compound.

The tackifier is for the purpose of improving adhesiveness, and conventionally known tackifiers can be used. Examples thereof include rosins, terpenes, a petroleum resin, a coumarone resin, and an indene resin.

(Barrier Layer)

The materials constituting the barrier layer may be any material as long as it is used as a barrier film, and examples thereof include a silicon oxide film ($SiO_X$), a silicon nitride film ($SiN_X$), a silicon oxynitride film ($SiO_XN_Y$), a silicon carbide film (SiOx), a silicon carbonitride film ($SiC_XN_Y$), an aluminum oxide film ($AlO_X$), an aluminum nitride film ($AlN_X$), an aluminum oxynitride film ($AlO_XN_Y$), a titanium oxide film ($TiO_X$), a titanium oxynitride film ($Tio_XN_Y$), ITO, and a polysilazane. The barrier layer may be monolayer or multilayer.

As the method for forming the barrier layer on the resin layer surface, conventionally known methods can be used, and examples thereof include methods such as coating, physical vapor deposition (PVD), chemical vapor deposition (CVD), and sputtering.

In order to protect the barrier layer, a protective layer may be further laminated.

(Antireflection Layer)

As the materials constituting the antireflection layer, conventionally known materials can be used, and examples thereof include an inorganic particle such as silica and an organic particle such as styrene and acrylic ones. In addition to them, other components such as a binder may also be contained.

(Release Layer)

As the release agent constituting the release layer, conventionally known materials can be used, and examples thereof include a silicone resin, a fluororesin, a long-chain alkyl polymer, a wax, and an olefin resin. The release layer may contain additive agents such as a peel force modifier and an oil.

(Antistatic Layer)

As the materials constituting the antistatic layer, conventionally known materials can be used, and the same materials as those for the aforementioned conductive layer can be used. Examples thereof include: a conductive metal oxide such as tin oxide, indium oxide, or zinc oxide; a polyaniline-based, polypyrrole-based, or polythiophene-based conductive polymer; a conductive carbon such as carbon black or ketjen black; a metal such as silver, copper, or aluminum; and a surfactant. In addition to the above, a resin component or the like may be contained as a binder. [011.9](Hydrophilic Layer, Water Repellent Layer, and Oil Repellent Layer) As the materials constituting the hydrophilic layer, conventionally known materials can be used, and examples thereof include one using a hydrophilic polymer such as polyvinyl alcohol, polyethylene glycol, or a polymer formed by adding hydrophilic functional groups to acrylic polymer, a surfactant, and an inorganic material such as silica.

As the materials constituting the water repellent layer and the oil repellent layer, conventionally known materials can be used, and examples thereof include a fluororesin, a wax, and a silicone.

(Ultraviolet Absorbing Layer and Infrared Absorbing Layer)

As the materials constituting the ultraviolet absorbing layer, conventionally known materials can be used, and examples thereof include a benzophenone-based, benzotriazole-based, triazine-based, cyanoacrylate-based, oxanilide-based, salicylate-based, or formamidine-based organic ultraviolet absorber. In addition to the above, an ultraviolet reflection agent such as titanium oxide or zinc oxide, or a hindered amine-based radical scavenger may also be added.

As the materials constituting the infrared absorbing layer, conventionally known materials can be used, and examples thereof include lanthanum hexaboride, cesium tungsten oxide, a cyanine dye, a phthalocyanine dye, a naphthalocyanine compound, a nickel dithiolene complex, a squalium dye, a quinone-based compound, a diimmonium compound, and an azo compound.

(Antiglare Layer)

As the materials constituting the antiglare layer, conventionally known materials can be used, and it is generally a mixture of a filler such as organic particles or inorganic particles, and a binder such as a thermoplastic resin or a thermosetting resin.

Examples of the organic particles include polystyrene beads, melamine resin beads, acrylic beads, acrylic-styrene beads, silicone beads, benzoguanamine beads, benzoguanamine-formaldehyde condensate beads, polycarbonate beads, and polyethylene beads.

Examples of the inorganic particles include inorganic oxide fine particles such as silica ($SiO_2$) fine particles, alumina fine particles, titania fine particles, tin oxide fine particles, antimony doped tin oxide (ATO) fine particles, zinc oxide fine particles.

Examples of the thermoplastic resin include a styrene-based resin, a (meth)acrylic resin, a vinyl acetate-based resin, a vinyl ether-based resin, a halogen-containing resin, an alicyclic olefin-based resin, a polycarbonate-based resin, a polyester-based resin, a polyamide-based resin, a cellulose derivative, a silicone-based resin, and a rubber or elastomer.

Examples of the thermosetting resin include a phenolic resin, a urea resin, a diallyl phthalate resin, a melamine resin, a guanamine resin, an unsaturated polyester resin, a polyurethane resin, an epoxy resin, an amino alkyd resin, a melamine-urea co-condensed resin, a silicon resin, and a polysiloxane resin.

(Polarizing Layer)

As the materials constituting the polarizing layer, conventionally known materials can be used, and examples thereof include a polyvinyl alcohol, a partially formalated polyvinyl alcohol, and an ethylene-vinyl acetate copolymer, as well as a dyed or dehydrated product thereof, and a dehydrochlorinated product of polyvinyl chloride.

(Insulating Layer)

As the insulating layer, conventionally known materials can be used, and examples thereof include: an inorganic material such as mica, ceramic, and glass; a thermoplastic resin such as polyester, polyamide, shellac, rosin, polyethylene, polypropylene, polyvinyl chloride, polystyrene, and polyester; a thermosetting resin such as phenol, melamine, epoxy, and silicone; and a rubber-based material such as natural rubber, butyl rubber, ethylene-propylene rubber, and silicone rubber.

(Light Emitting Layer)

As the materials constituting the light emitting layer, conventionally known materials can be used, and examples thereof include: a dyeing material such as a cyclopentamine derivative, a tetraphenylbutadiene derivative, a triphenylamine derivative, an oxadiazole derivative, a pyrazoloquinoline derivative, a distyrylbenzene derivative, a distyrylarylene derivative, a silole derivative, a thiophene ring compound, a pyridine ring compound, a perinone derivative, a perylene derivative, an oligothiophene derivative, a trifumanylamine derivative, an oxadiazole dimer, and a pyrazoline dimer; a metal complex-based material such as a metal complex that has Al, Zn, Be, or the like, or a rare earth metal such as Tb, Eu, or Dy as the central metal, and has an oxadiazole, thiadiazole, phenylpyridine, phenylbenzimidazole, or quinoline structure as the ligand, including an aluminum quinolinol complex, a benzoquinolinol beryllium complex, a benzoxazole zinc complex, a benzothiazole zinc complex, an azomethyl zinc complex, a porphyrin zinc complex, and a europium complex; and a polymeric material such as a poly(p-phenylene vinylene) derivative, a polythiophene derivative, a poly(p-phenylene) derivative, a polysilane derivative, a polyacetylene derivative, a polyfluorene derivative, a polyvinylcarbazole derivative, and one formed by making the dyeing material and metal complex-based light emitting material described above into a polymer.

In addition to the light emitting materials described above, the following doping materials may be added for the purpose of improving the luminous efficiency in the light emitting layer, changing the emission wavelength, and the like: a perylene derivative, a coumarin derivative, a rubrene derivative, a quinacridone derivative, a squarylium derivative, a porphyrene derivative, a styryl-based dye, a tetracene derivative, a pyrazoline derivative, decacyclene, and phenoxazone. Furthermore, a surfactant or the like may be added for the purpose of improving printability.

(Adhesive Layer)

As the materials constituting the adhesive layer, conventionally known materials can be used, and examples thereof include vinyl acetate, a vinyl acetate-vinyl chloride copolymer, a polyvinyl butyral, a polyolefin, a polyamide, a natural rubber, a synthetic rubber, a silicone rubber, a polyurethane, a polyester, a phenolic resin, an epoxy resin, a polyimide resin, an acrylate resin, and a cyanoacrylate.

(Printing Layer)

As the materials constituting the printing layer, conventionally known materials can be used. For example, it is a layer having a colored pigment and/or dye and a binder (also called a vehicle), and a stabilizer, a light stabilizer, a curing agent, a crosslinking agent, a plasticizer, an antioxidant, an ultraviolet absorber, a particle, an antistatic agent, a filler, or another additive agent may be appropriately added, if necessary. Examples of the binder include a rosin, a rosin ester, a rosin-modified resin, a shellac, an alkyd resin, a phenolic resin, a polyacetic acid-based resin, a polystyrene-based resin, a polyvinyl butyral resin, an acrylic or methacrylic resin, a polyamide-based resin, a polyester-based resin, a polyurethane-based resin, an epoxy-based resin, a urea resin, a melamine resin, an amino alkyd resin, gun cotton, nitrocellulose, ethyl cellulose, a chlorinated rubber, a cyclized rubber, a flax oil, a tung oil, a soybean oil, and a hydrocarbon oil.

<Use of Laminated Film>

The laminated film of the present invention has a haze of 3% or less and can be used in a variety of optical applications. In addition, since the laminated film of the present invention has the resin layer not only excellent in close adhesion with the base film, but also in adhesiveness with a variety of functional layers, it can be suitably used as an optical laminated body. Furthermore, the laminated film of the present invention has a haze of 3% or less and also has excellent blocking resistance and scratch resistance, thus reducing the concern of reduced transparency.

Taking advantage of these characteristics, the laminated film of the present invention can be suitably used for a variety of display components, among other optical applications. In particular, since the semi-aromatic polyamide film, which is the base film, originally has flex resistance, it is particularly suitable for use in flexible displays using organic EL.

When a hard coat layer is formed on the laminated film, it can be used as a cover film for the surface layer of flexible displays. When a conductive layer is formed, it can be used as a sensor film for touch panels. When a barrier layer is formed, it can be used as a barrier film for protecting organic EL elements. It can also be used as a base film for laminating the light emitting layer of organic EL.

In addition, since the laminated film of the present invention is pliable and has excellent flexibility, it can also be used as a shock absorbing layer in displays of smart phones and the like for mitigating shocks from drops and the like. The laminated film of the present invention also has excellent flex resistance, and thus can be used as a display device in foldable smart phones.

Examples of configurations of laminated bodies obtained by laminating a functional layer on the laminated film of the present invention and then further providing a transparent base material layer such as a transparent polyimide or a glass plate include the followings:

(hard coat layer/laminated film of the present invention)/sticky layer/transparent base material layer;

transparent base material layer/sticky layer/(conductive layer/laminated film of the present invention)/sticky layer;

transparent base material layer/sticky layer/(laminated film of the present invention/barrier layer)/sticky layer/organic EL light emitting layer;

transparent base material layer/sticky layer/(barrier layer/laminated film of the present invention)/organic EL light emitting layer); and transparent base material layer/sticky layer/(laminated film of the present invention)/sticky layer/(conductive layer/transparent base material layer).

OCAs and adhesives can be used as the sticky layer described above.

Also, in the above configurations, it is particularly desirable to use a double-sided resin layer-formed film as the laminated film of the present invention. When the double-sided resin layer-formed film is used, not only does it enable processing with enhanced close adhesion with a variety of functional layers, but it also suppresses scratching caused by rubbing against rolls during processing, and transparency is not Impaired. Furthermore, the double-sided resin layer-formed film can be effectively 1.0 used in laminated bodies where transparency is not required. For example, in lamination with circuit boards, flexible printed circuit boards, and metals such as copper foil as well, the double-sided resin layer-formed film has good adhesiveness and can be processed with enhanced close adhesion with a variety of functional layers.

In addition to the above-mentioned display application and flexible printed circuit board application, the laminated film of the present invention can be developed for various other applications, and it can be suitably used as a film or the like for household and industrial materials, such as: a sensor component; a pharmaceutical packaging material; a food packaging material for retort pouch foods and the like; an electronic component packaging material for semiconductor packages and the like; an electrical insulating material for motors, transformers, cables, and the like; an inductor material for the capacitor application and the like; a material for magnetic tapes such as cassette tapes, magnetic tapes for storing data for digital data storage, and video tapes; a solar cell substrate; a liquid crystal plate; a conductive film; an organic LED; a film for mounting on sensors; a protective plate for display devices and the like; an LED mounting substrate; an electronic substrate material such as a flexible flat cable; a coverlay film for flexible printed wiring; a tape for heat resistant masking; a heat resistant sticky tape such as an industrial tape; a heat resistant barcode label; a heat resistant reflector; a variety of release films; a heat resistant sticky base film; a photographic film; a molding material; an agricultural material; a medical material; a material for civil engineering and construction; and a filtration membrane.

EXAMPLES

Hereinafter, the present invention will be specifically described with reference to Examples.

The evaluation methods for a variety of physical properties in the following Examples and Comparative Examples were as follows. Unless otherwise rioted, all measurements were carried out under an environment with a temperature of 23° C. and a humidity of 50%.

<Evaluation Methods>

(1) Characteristics of Semi-Aromatic Polyamide

[Limiting Viscosity [η]]

At 30° C. in concentrated sulfuric acid, the inherent viscosity (ηinh) of a sample at each concentration of 0.05, 0.1, 0.2, or 0.4 g/dl was determined from the following expression, and the value obtained by extrapolating this to a concentration of 0 was defined as the limiting viscosity [η].

$$\eta inh=[\ln(t1/t0)]/c$$

[In the expression, ηinh represents the inherent viscosity (dl/g), t0 represents the flow time of the solvent (sec), t1 represents the flow time of the sample solution (sec), and c represents the concentration of the sample in the solution (g/dl)].

[Melting Point (Tm) and Glass Transition Temperature (Tg)]

Using a DSC device (DSC7 manufactured by PerkinElmer, Inc.), the temperature of a semi-aromatic polyamide was increased from 20° C. to 350° C. at 10° C./min under a nitrogen atmosphere and held for 5 minutes (1st Scan), then cooled from 350° C. to 20° C. at 100° C./min and held for 5 minutes. Furthermore, the temperature was increased again from 20° C. to 350° C. at 10° C./min (2nd Scan), and the glass transition temperature during this process was defined as the Tg of the semi-aromatic polyamide. Similarly, the peak top temperature of the crystal melting peak observed in the 2nd Scan was defined as the Tm.

(Crystallization Heat Capacity of Unstretched Film)

For 10 mg of an unstretched film of the semi-aromatic polyamide, using a DSC device (DSC-7 manufactured by PerkinElmer, Inc.), the temperature was increased from 40° C. to 350° C. at 20° C./min under a nitrogen atmosphere (1st Scan), and the heat capacity of the exothermic peak obtained was determined.

(2) Characteristics of Dimer Acid-based Polyamide

[Acid Value and Amine Value]

The acid value and the amine value were measured by the methods described in JIS K2501.

[Softening Point Temperature]

Using 10 mg of resin as the sample, the measurement was carried out under conditions with a temperature rising rate of 20° C./min, using a microscope equipped with a heating (cooling) device heat stage for microscopes (manufactured by Linkam Scientific Instruments Ltd., Heating-Freezing ATAGE TH-600 model), and the temperature at which the resin begins to be deformed was defined as the softening point.

(3) Characteristics of Dimer Acid-based Polyamide Resin Aqueous Dispersion

[Solid Content Concentration]

The obtained aqueous dispersion was weighed in an appropriate amount and this was heated at 150° C. until the mass of the remaining material (solid content) reached a constant amount, thereby determining the solid content concentration.

[Viscosity]

By using a B-type viscometer (manufactured by Tokimec, Inc., DVL-BII type digital viscometer), the rotational viscosity (mPa·s) at a temperature of 25° C. was measured.

(4) Characteristics of Laminated Film

[Thickness]

The laminated film was left in an environment of 23° C. and 501 RH for 2 hours or longer, and then observation of the film cross-section was carried out with a transmission electron microscope (TEM), and the thickness of each layer was measured. Note that, when the resin layer contains fine particles whose average particle diameter is larger than the thickness of the resin layer, the thickness of the resin layer in the area where the fine particles do not exist was measured.

[Thermal Shrinkage Factor]

The laminated film that had been subjected to humidity control at 23° C.×50% RH for 2 hours was cut into strips of 10 mm width×150 mm, and two marked lines were made on the strips with an interval of 100 mm to make test pieces. The obtained test pieces were subjected to a heat treatment in an oven at 250° C. for 5 minutes under no load, and then the test pieces were taken out and humidity control was performed for 2 hours at 23° C.×50% RH, after which the distance between the marked lines was measured. The thermal shrinkage factor was determined using the following expression for each of the three samples for measurement in the longitudinal direction (MD) and the transverse direction (TD) of the film, and the average value of the thermal shrinkage factor in each direction was calculated. Thermal Shrinkage Factor (%)=(A−B)/A×100

A: Distance between marked lines before heat treatment (mm), and B: Distance between marked lines after heat treatment (mm)

[Tensile Elongation at Break]

In accordance with JIS K7127, the tensile elongations at break in the longitudinal direction and in the width direction of the laminated film were measured.

[Haze and Total Light Transmittance]

Using a haze meter (NDH 2000) manufactured by Nippon Denshoku industries Co., Ltd., measurements of the total light transmittance (Tt) and the diffuse transmittance (Td) of the laminated film were carried out in accordance with JIS K7105, and the haze was calculated based on the following expression.

$$Haze(\%)=(Td/Tt)\times 100$$

[Dynamic Friction Coefficient]

In accordance with JIS K7125, the dynamic friction coefficient between the resin layers of the laminated film was measured. The laminated film was wound around a slider with a mass of 200 g such that the resin layer served as the surface layer, and the slider was slid at a test speed of 100 mm/min on a test table coated such that the resin layer served as the surface layer.

[Close Adhesion]

For the resin layers of the laminated films, the close adhesion of the base film/resin layer was evaluated by the cross-cut method, in accordance with the method described in JIS K 5600.

In detail, the laminated film, on which humidity control had been sufficiently carried out in an environment of 23° C. and 50% RH, was cross-cut from the resin layer side to create a lattice pattern of 100 sections, and then a sticky tape (manufactured by Nichiban Co., Ltd., TF-12) was pasted to the resin layer side and the tape was vigorously peeled off. The close adhesion of the base film/resin layer was evaluated from the number of the resin layer lattices remaining on the base material.

[Blocking Resistance]

The laminated film was unwound from a film roll of laminated film and the blocking resistance was evaluated.

Excellent: The laminated film can be unwound without any resistance.

Good: When unwinding, the sound of the films peeled off from each other is heard, but the film after unwinding is transparent with no whitening.

Fair: When unwinding, the sound of the films peeled off from each other is heard, and whitening of the resin layer is observed after unwinding.

Poor: Strong resistance occurs when unwinding, and whitening of the resin layer is observed after unwinding.

[Flex Resistance]

The laminated films were cut into rectangular shapes of 30×100 mm to make samples. The samples were fixed on a durability testing machine (DLDMLH-FS manufactured by Yuasa System Co., Ltd.) with each short side of the samples attached such that the minimum distance between the two opposing sides was 1.5 mm. The samples were subjected to a flexion test in which the surface side of the samples was folded by 180 degrees (the resin layer was inside) up to 100000 times, and it was visually checked whether cracks, fold marks, whitening, breakage, or the like occurred in the flexed part. After every 10000 times of folding, the samples were visually checked, and the flexion test was continued for the samples where no change was observed in the flexed part or the samples where change was observed in the flexed part but the level of change was not a problem in practical use. For those with apparent cracks, fold marks, whitening, breakage, or the like occurring at the flexed part, the test was discontinued. After 100000 times of folding, the flex resistance was evaluated by the following criteria.
Excellent: After 100000 times of folding, there were no cracks or breakage in the flexed part, and no fold marks or whitening occurred.
Good: After 100000 times of folding, there were no cracks or breakage in the flexed part, and no whitening occurred although fold marks remained.
Poor: Cracks or breakage occurred in the flexed part, and the test was thus discontinued.

[Scratch Resistance]

For the laminated film on which the measurement of the dynamic friction coefficient had been carried out as described above, the presence or absence of scrapes on the resin layer surface of the laminated film was visually examined according to the following criteria.
Good: No scrapes are observed at all.
Fair: A few scrapes are observed.
Poor: Numerous scrapes are observed and transparency is impaired.

[Scrape Resistance]

For the laminated film with a haze of 31 or less on which the evaluation of blocking resistance had been carried out, the scrape resistance was visually examined according to the following criteria.
Good: No whitening or scrapes are observed on the coating film, and the film has good transparency.
Poor: Whitening or scrapes are observed on the coating film, which impair transparency.

(5) Characteristics of ITO Laminated Body

[Formation of ITO Coating]

A laminated film having an ITO coating with a thickness of 50 nm formed on the resin layer of the laminated film was obtained by sputtering using a sintered mixture of indium oxide and tin oxide (97% by mass of indium oxide and 3% by mass of tin oxide) in an atmosphere of $4 \times 10^{-1}$ Pa, consisting of 80% argon gas and 20% oxygen gas.

[Haze and Total Light Transmittance]

By the same method as the evaluation method for the haze and the total light transmittance of the laminated film, the haze and the total light transmittance of the laminated film having the ITO coating formed thereon were determined.

[Conductivity]

For the laminated film having the ITO coating formed thereon, the surface resistivity ($\Omega$/sq) was measured with a low resistivity meter (manufactured by Mitsubishi Chemical Analytech Co., Ltd., Loresta AX MCP-T700) in an environment of 25° C. and 50% RH, and depending on the surface resistivity obtained, the conductivity was evaluated according to the indexes below.
The conductivity is preferably 1000 $\Omega$/sq or less for practical use, and particularly preferably 100 n/sq or less.
Good: 100 $\Omega$/sq or less
Fair: greater than 100 $\Omega$/sq and 1000 $\Omega$/sq or less
Poor: greater than 1000 $\Omega$/sq

[Adhesiveness]

A peeling test was carried out by the cross-cut method in an environment of 23° C. and 50% RH in accordance with the method described in JIS K5600. In detail, a sticky tape (manufactured by Nichiban Co., Ltd., TF-12) was applied to the ITO coating, which had been cut to create a lattice pattern of 100 sections, and the tape was vigorously peeled off. After the peeling test, the aforementioned measurement of conductivity was carried out, and one with no change in conductivity before and after the peeling test was evaluated as having good adhesiveness (Good). One with a reduction in conductivity of $10^3$ or more before and after peeling tests was evaluated as having poor adhesiveness (Poor).

[Curl by Moisture Absorption]

For the laminated film having the ITO coating formed thereon, a test piece (100 mm width×100 mm length) was cut out, placed on a horizontal stand with the film surface facing downward, and left in an environment with a temperature of 20° C. and a humidity of 40% RH for 2 days for humidity control. Thereafter, the film was left in an environment with a temperature of 20° C. and a humidity of 901 RH for 2 days. According to the degree of curl in the test piece, that is, the height at which an end of the test piece was lifted from the stand, the moisture absorbency of the film was evaluated.
Excellent: No curl occurred.
Good: Slight curl occurred in the longitudinal direction or in the width direction. No practical problems.
Fair: Curl occurred in the longitudinal direction or in the width direction. Practical problems exist.

(6) Characteristics of Copper Foil Laminated Body

[Lamination of Copper Foil]

To 100 parts by mass of a bisphenol A type epoxy resin (jER828 manufactured by Mitsubishi Chemical Corporation), dicyandiamide (DD manufactured by Nippon Carbide Industries Co., Inc.) was mixed such that it became 5.5 parts by mass, thereby obtaining a coating agent for adhesive layer formation. From the laminated film in the absolute dry state immediately after production, a film slice (200 mm width×300 mm length) was cut out, and the above-described coating agent was casted and applied to the resin layer surface using an applicator to form an adhesive layer with a final dry thickness of 3 sm.

After drying at 80° C. for 30 minutes, the formed adhesive layer was heated at 150° C. for 10 minutes to bring it to the semi-cured B stage state. Furthermore, via this adhesive layer, an electrolytic copper foil (manufactured by Furukawa Electric Co., Ltd., surface CTS treatment, thickness of 18 μm) with the same size as the film slice was laminated to the film slice, and the adhesive layer was completely cured by heat pressing to obtain a laminated body. Note that the heat pressing was carried out using a heat press machine under conditions with a temperature of 180° C., a time of 15 minutes, and a pressure of 2 MPa.

[Heat Resistance]

From the obtained laminated body, a test piece (100 mm width×100 mm length) was cut out and subjected to a heat treatment in a reflow soldering furnace set at a temperature of 260° C. for 15 seconds, and then taken out of the furnace and left at room temperature (23° C.) for 1 hour. Deformation of the laminated body after the heat treatment was visually confirmed and evaluated according to the following criteria.
Excellent: Not deformed at all.
Good: Flatness was not compromised, but slight strain occurred.
Fair: Strain is present, but no practical problems.
Poor: Large strain and no practical usefulness.

[Curl by Moisture Absorption]

For the obtained laminated body, a test piece (100 mm width×100 mm length) was cut out, placed on a horizontal stand with the film surface facing downward, and left in an environment with a temperature of 20° C. and a humidity of 40% RH for 2 days for humidity control. Thereafter, the film was left in an environment with a temperature of 20° C. and a humidity of 90% RH for 2 days. According to the degree of curl in the test piece, that is, the height at which an end of the test piece was lifted from the stand because the copper foil is not affected by moisture absorption and only the semi-aromatic polyamide film absorbs moisture and extends, causing the test specimen to be curled, the moisture absorbency of the film was evaluated.

Excellent: No curl occurred.

Good: Slight curl occurred in the longitudinal direction or in the width direction. No practical problems.

Fair: Curl occurred in the longitudinal direction or in the width direction. Practical problems exist.

[Adhesiveness]

In the aforementioned evaluation of curl by moisture absorption, one in which no floating or peeling occurred at the lamination interface was evaluated as having good adhesiveness (Good), and one in which floating or peeling occurred was evaluated as having poor adhesiveness (Poor).

<Raw Materials>

The following resin aqueous dispersions were used to prepare coating agents for resin layer formation.

[Dimer Acid-based Polyamide Resin Aqueous Dispersion E-1]

As a dimer acid-based polyamide P-1, used was a polyamide resin containing 100 mol % of a dimer acid as the dicarboxylic acid component and 100 mols, of ethylenediamine as the diamine component, and having an acid value of 10.0 mg KOH/g, an amine value of 0.1 mg KOH/g, and a softening point of 158° C.

In a sealable, pressure resistant glass container (capacity: 1 liter) equipped with a stirrer and a heater, 75.0 g of the dimer acid-based polyamide P-1, 37.5 g of isopropanol (IPA), 37.5 g of tetrahydrofuran (THF), 7.2 g of N,N-dimnethylethanolamine, and 217.8 g of distilled water were charged. While stirring at a rotation speed of 300 rpm, the system was heated inside, and heating and stirring were carried out at 120° C. for 60 minutes. Thereafter, the mixture was cooled to near room temperature (about 30° C.) with stirring, and after adding 100 g of distilled water, it was filtered through a 300 mesh stainless steel filter (wire diameter of 0.035 mm, plain woven) while very slightly pressurized. The obtained aqueous dispersion was placed in a 1 L eggplant flask and decompressed using an evaporator while being kept in a hot water bath heated to 80° C. to remove about 100 g of the mixed media of IPA, THF, and water, thereby obtaining a milky white, uniform dimer acid-based polyamide resin aqueous dispersion E-1. The solid content concentration of E-1 was 20: by mass, the number average particle diameter of the resin in the dispersion was 0.040 μm, the pH was 10.4, and the viscosity was 36 mPa·s.

[Dimer Acid-based Polyamide Resin Aqueous Dispersion E-2]

As a dimer acid-based polyamide P-2, used was a polyamide resin containing 85 mol, of a dimer acid and 15 mol % of azelaic acid as the dicarboxylic: acid component and 50 mol % of piperazine and 50 mol % of ethylenediamine as the diamine component, and having an acid value of 15.0 mg KOH/g, an amine value of 0.3 mg KOH/g, and a softening point of 110° C.

In a sealable, pressure resistant glass container (capacity: 1 liter) equipped with a stirrer and a heater, 75.0 g of the dimer acid-based polyamide P-2, 93.8 g of IPA, 6.0 g of N,N-dimethylethanolamine, and 200.3 g of distilled water were charged. While stirring at a rotation speed of 300 rpm, the system was heated inside, and heating and stirring were carried out at 120° C. for 60 minutes. Thereafter, the mixture was cooled to near room temperature (about 30° C.) with stirring, and after adding 130 g of distilled water, it was filtered through a 0.300 mesh stainless steel filter (wire diameter of 0.035 mm, plain woven) while very slightly pressurized. The obtained aqueous dispersion was placed in a 1 L eggplant flask and decompressed using an evaporator while being kept in a hot water bath heated to 80° C. to remove about 130 g of the mixed media of IPA and water, thereby obtaining a milky white, uniform dimer acid-based polyamide resin aqueous dispersion E-2. The solid content concentration of E-2 was 20% by mass, the number average particle diameter of the resin in the dispersion was 0.052 μm, the pH was 10.6, and the viscosity was 30 mPa·s.

[Urethane Resin Aqueous Dispersion L-1]

Takelac WPB-341 (30) manufactured by Mitsui Chemicals Inc., solid content concentration of 30% by mass

[Urethane Resin Aqueous Dispersion L-2]

Takelac WS-4000 manufactured by Mitsui Chemicals Inc., solid content concentration of 30% by mass

[Acrylic Resin Aqueous Dispersion L-3]

Nikasol RX-7033 manufactured by Nippon Carbide Industries Co., Inc., solid content concentration of 351: by mass

[Copolyamide Resin Aqueous Dispersion L-4]

Sepolsion PA-200 manufactured by Sumitomo Seika Chemicals Co., Ltd., solid content concentration of 40% by mass The following were used as the fine particles constituting the resin layer:

F-1: Colloidal silica fine particles ("Quartron PL-7" manufactured by Fuso Chemical Co., Ltd.), average particle diameter of 0.075 μm;

F-2: Acrylic fine particles ("Uni-powder NMB-0220C" manufactured by JXTG Nippon Oil & Energy Corporation), average particle diameter of 2 μm; and F-3: Acrylic fine particles ("Uni-powder NMB-0520C" manufactured by JXTG Nippon Oil & Energy Corporation), average particle diameter of 5 μm.

The following was used as the crosslinking agent:

C-1: Aqueous solution of oxazoline compound (Epocros WS-700 manufactured by Nippon Shokubai Co., Ltd., solid content concentration of 25% by mass).

The following were used as the resins constituting the base material.

[Semi-Aromatic Polyamide A]

In a reaction vessel, 3289 parts by mass of terephthalic acid (TA), 2533 parts by mass of 1,9-nonanediamine (NDA), 633 parts by mass of 2-methyl-1,8-octanediamine (MODA), 48.9 parts by mass of benzoic acid (BA), 6.5 parts by mass of sodium hypophosphite monohydrate (0.1% by mass relative to the aforementioned four polyamide raw materials in total), and 2200 parts by mass of distilled water were placed, and the vessel was purged with nitrogen. The molar ratio of these raw materials (TA/BA/NDA/MODA) is 99/2/80/20.

The contents of the reaction vessel were stirred at 100° C. for 30 minutes, and then the internal temperature was raised to 210° C. over a period of 2 hours. At this time, the pressure inside the reaction vessel was raised to 2.12 MPa (22 kg/cm$^2$). After continuing the reaction as it was for 1 hour, the temperature was raised to 230° C. Then, the temperature was maintained at 230° C. for 2 hours, and the reaction was carried out while maintaining the pressure at 2.12 MPa (22 kg/cm²) by gradually removing water vapor. Next, the pressure was decreased to 0.98 MPa (10 kg/cm) over 30 minutes, and the reaction was further carried out for 1 hour to obtain a prepolymer. This prepolymer was dried at a temperature of 100° C. for 12 hours under reduced pressure, and then crushed to a size of 2 mm or less.

Subsequently, the crushed prepolymer was subjected to solid phase polymerization under conditions with a temperature of 230° C. and a pressure of 13.3 Pa (0.1 mmHg) for 10 hours, thereby obtaining a polymer. This was fed into a twin-screw extruder ("TEX44C" manufactured by The Japan Steel Works, LTD.), and melt-kneaded and extruded under conditions with a cylinder temperature of 320° C., then cooled and cut, thereby producing pellets of a semi-aromatic polyamide A.

The semi-aromatic polyamide A had a limiting viscosity of 1.17 dl/g, a melting point of 290° C., and a glass transition temperature of 125° C.

[Semi-Aromatic Polyamide B]

In a reaction vessel, 489 parts by mass of terephthalic acid (TA), 507 parts by mass of 1,10-decanediamine (DDA), 2.8 parts by mass of benzoic acid (BA), 1.0 part by mass of sodium hypophosphite monohydrate (0.1% by mass relative to the aforementioned four polyamide raw materials in total), and 1000 parts by mass of distilled water were placed, and the vessel was purged with nitrogen. The molar ratio of these raw materials (TA/BA/DDA) is 99/2/100.

The contents of the reaction vessel were stirred at 80° C. for 0.5 hours at 28 rotations per minute, and then the temperature was raised to 230° C. Subsequently, the contents were heated at 230° C. for 3 hours. Then, the reaction product was cooled and taken out.

That reaction product was crushed, then heated in a dryer at 220° C. for 5 hours under a stream of nitrogen, and subjected to solid phase polymerization to obtain a polymer. This was fed into a twin-screw extruder ("TEX44C" manufactured by The Japan Steel Works, LTD.), and melt-kneaded and extruded under conditions with a cylinder temperature of 320° C., then cooled and cut, thereby producing pellets of a semi-aromatic polyamide B.

The semi-aromatic polyamide B had a limiting viscosity of 1.24 dl/g, a melting point of 316° C., and a glass transition temperature of 150° C.

[Silica-Containing Master Chip (M1)]

98 parts by mass of the semi-aromatic polyamide A and 2 parts by mass of silica (F-4) (Tosoh Silica Corporation, NIPGEL AZ-204, average particle diameter of 1.7 sum) were melt-kneaded to make a master chip (M1).

Example 1

<Preparation of Coating Agent for Resin Layer Formation>

The dimer acid-based polyamide resin aqueous dispersion E-1 and the crosslinking agent C-1 were mixed such that the solid content mass ratio of each component was 100:10, and the mixture was mixed and stirred at room temperature for 5 minutes. Furthermore, the acrylic fine particles F-2 and the colloidal silica fine particles F-1 were mixed therewith so that their contents relative to the entire components constituting the resin layer were 0.21: by mass and 1% by mass, respectively, thereby obtaining a coating agent for resin layer formation.

<Production of Laminated Film>

The semi-aromatic polyamide A was introduced into and molten in a 65 mm single-screw extruder with the cylinder temperature set to 295° C. (former stage), 320° C. (middle stage), and 320° C. (latter stage), and extruded into a film form through a T-die set to 320° C. The film was cooled by pressing and closely adhering it onto a cooling roll (coated with a 0.015-mm-thick ceramic, actual surface temperature of 40° C.) by the electrostatic application method, thereby obtaining an unstretched film with a thickness of 400 μm that was substantially unoriented. Note that, as the electrostatic application method, the surface of the ceramic coating layer was discharged by placing two carbon brushes side by side upstream from the point where the roll surface comes into contact with the film and bringing them into contact with the cooling roll, and grounding the holders of the carbon brushes. A tungsten wire with a diameter of 0.2 mm was used as the electrode, and a voltage of 6.5 kV was applied with a 300 W (15 kV×20 mA) DC high-voltage generator.

Next, after stretching the obtained unstretched film by 2.3 times under conditions of 130° C. with a roll-type longitudinal stretching machine, a coating agent for resin layer formation was applied to one surface of the longitudinally stretched film with a gravure roll such that the amount of applied resin after stretching was 0.3 g/m2. Thereafter, successively, the ends of the sheet were gripped by clips of a flat-type stretching machine, transverse stretching was performed by 3.5 times under conditions of 113° C., and then the sheet was subjected to heat setting at 275° C. with a relaxation rate of 6% in the longitudinal direction and a relaxation rate of 3 in the transverse direction, thereby obtaining a laminated film in which a resin layer with a thickness of 0.30 μm was provided on one surface of a sequentially and biaxially stretched semi-aromatic polyamide film with a thickness of 50 μm.

Examples 2 to 1.2 and Comparative Examples 1 to 5

Laminated films were obtained in the same manner as in Example 1, except that the cooling roll temperature, the unstretched film thickness, the stretching ratio, the relaxation rate, and the heat setting temperature were changed.

Example 13

A laminated film in which a resin layer with a thickness of 0.15 μm was provided on both surfaces of the semi-aromatic polyamide film was obtained in the same manner as in Example 1, except that the coating agent for resin layer formation was changed to be applied to both surfaces with a gravure roll such that the amount of applied resin for one surface after stretching was 0.15 g/m².

Examples 14 to 18

Laminated films were obtained in the same manner as in Example 1, except that the type of resin used in the coating agent for resin layer formation was changed.

Examples 19 to 22

Laminated films were obtained in the same manner as in Example 1, except that the type and content of fine particles used in the coating agent for resin layer formation were changed.

Examples 23 and 24

Laminated films were obtained in the same manner as in Example 1, except that the unstretched film thickness was changed and the base film thickness was changed.

Examples 25 and Comparative Example 6 In Example 25, a laminated film was obtained in the same manner as in Example 1, except that the silica-containing master chip (M1) was mixed in such that the content of silica fine particles in the base film was 0.025% by mass, thereby obtaining the base film.

In Comparative Example 6, a laminated film was obtained in the same manner as in Example 25, except that the unstretched film thickness was changed to 500 μm and the stretching ratio in the longitudinal direction was changed to 2.8 times.

Comparative Example 7

Without applying a coating agent for resin layer formation to the base film, a biaxially stretched film having a thickness of 50 μm made of the semi-aromatic polyamide was obtained. The conditions for film production, stretching, and heat setting were the same as in Example 1.

Comparative Example 8

A laminated film was obtained in the same manner as in Example 1, except that the no fine particles were contained in the coating agent for resin layer formation.

Example 26

An unstretched film was obtained by carrying out the same operations as in Example 1, except that the unstretched film thickness was changed to 250 μm. Next, the coating agent for resin layer formation was applied to one surface of the unstretched film with a gravure roll such that the amount of applied resin after stretching was 0.3 g/m². Then, while gripping the unstretched film with clips at both ends, it was led into a tenter-type simultaneous biaxial stretching machine and subjected to simultaneous biaxial stretching with a preheating section temperature of 155° C., a stretching section temperature of 154° C., a longitudinal stretching strain rate of 2400%/min, a transverse stretching strain rate of 2760%/min, a stretching ratio in the longitudinal direction of 3.0 times, and a stretching ratio in the transverse direction of 3.3 times. Then, the film was subjected to heat setting at 275° C. with a relaxation rate of 6% in the longitudinal direction and a relaxation rate of 8% in the transverse direction, thereby obtaining a laminated film in which a resin layer with a thickness of 0.30 μm was provided on one surface of a simultaneously and biaxially stretched semi-aromatic polyamide film with a thickness of 251 μm.

Example 27

A laminated film was obtained in the same manner as in Example 26, except that the semi-aromatic polyamide B was used as the resin constituting the base film, the unstretched film thickness was changed to 150 μm, and the simultaneous biaxial stretching was performed with a stretching ratio in the longitudinal direction of 2.5 times and a stretching ratio in the transverse direction of 2.5 times.

Comparative Example 9

A laminated film was obtained in the same manner as in Example 26, except that the relaxation rate in the longitudinal direction was changed to 2% and the heat setting temperature was changed to 250° C.

The configuration and production conditions of the laminated films of Examples and Comparative Examples, as well as the characteristics of the obtained laminated films, are shown in Tables 1 to B. In addition, for laminated films having the ITO coating formed or the copper foil laminated thereon, the characteristics of the obtained laminated bodies are also shown.

TABLE 1

| | | | | | Example | | | | |
|---|---|---|---|---|---|---|---|---|---|
| | | | | | 1 | 2 | 3 | 4 | 5 |
| Configuration of laminated film | Base film | Resin type | | | A | A | A | A | A |
| | | Fine particle | Type | | — | — | — | — | — |
| | | | Particle diameter | μm | — | — | — | — | — |
| | | | Content | %[1) | 0 | 0 | 0 | 0 | 0 |
| | | Thickness | | μm | 50 | 50 | 50 | 50 | 50 |
| | Resin layer | Resin | Aqueous dispersion type | | E-1 | E-1 | E-1 | E-1 | E-1 |
| | | Crosslinking agent | Type | | C-1 | C-1 | C-1 | C-1 | C-1 |
| | | | | Parts[2) | 10 | 10 | 10 | 10 | 10 |
| | | Fine particle A | Type | | F-2 | F-2 | F-2 | F-2 | F-2 |
| | | | Particle diameter | μm | 2.0 | 2.0 | 2.0 | 2.0 | 2.0 |
| | | | Content | %[3) | 0.2 | 0.2 | 0.2 | 0.2 | 0.2 |
| | | Fine particle B | Type | | F-1 | F-1 | F-1 | F-1 | F-1 |
| | | | Particle diameter | μm | 0.075 | 0.075 | 0.075 | 0.075 | 0.075 |
| | | | Content | %[3) | 1 | 1 | 1 | 1 | 1 |
| | | Fine particle content (A + B) | | %[3) | 1.2 | 1.2 | 1.2 | 1.2 | 1.2 |
| | | Thickness | | μm | 0.30 | 0.30 | 0.30 | 0.30 | 0.30 |
| Production conditions | Film production | Cooling roll temperature | | ° C. | 40 | 40 | 40 | 40 | 40 |
| | | Crystallization heat capacity | | J/g | 27 | 27 | 27 | 27 | 27 |
| | | Unstretched film thickness | | μm | 400 | 400 | 400 | 400 | 400 |
| | Stretching | Biaxial stretching method | | | Sequential | Sequential | Sequential | Sequential | Sequential |
| | | Stretching ratio | Longitudinal direction | Times | 2.3 | 2.3 | 2.3 | 2.3 | 2.3 |
| | | | Width direction | Times | 3.5 | 3.6 | 3.5 | 3.5 | 3.6 |
| | | Stretched or unstretched before and after application of coating agent | Before application | | Stretched | Stretched | Stretched | Stretched | Stretched |
| | | | After application | | Stretched | Stretched | Stretched | Stretched | Stretched |

TABLE 1-continued

|  |  |  |  |  | Example | | | | |
|---|---|---|---|---|---|---|---|---|---|
|  |  |  |  |  | 1 | 2 | 3 | 4 | 5 |
|  | Heat setting | Relaxation rate | Longitudinal direction | % | 6 | 1 | 10 | 2 | 2 |
|  |  |  | Width direction | % | 8 | 8 | 8 | 1 | 12 |
|  |  | Temperature |  | °C. | 275 | 275 | 275 | 275 | 275 |
| Characteristics of laminated film | Thermal shrinkage factor |  | Longitudinal direction | % | 0.1 | 1.1 | −0.2 | 1.0 | 0.8 |
|  |  |  | Width direction | % | 0.2 | 0.5 | 0.1 | 1.4 | −0.2 |
|  |  |  | \|Difference\| | % | 0.1 | 0.6 | 0.3 | 0.4 | 1.0 |
|  | Tensile elongation at break |  | Longitudinal direction | % | 129 | 108 | 130 | 120 | 102 |
|  |  |  | Width direction | % | 98 | 103 | 96 | 90 | 116 |
|  | Haze |  |  | % | 0.8 | 0.6 | 0.9 | 0.6 | 0.7 |
|  | Total light transmittance |  |  | % | 90.8 | 91.0 | 90.6 | 91.0 | 90.9 |
|  | Dynamic friction coefficient |  |  |  | 0.43 | 0.43 | 0.43 | 0.43 | 0.43 |
|  | Close adhesion |  |  |  | 100 | 100 | 100 | 100 | 100 |
|  | Blocking resistance |  |  |  | Excellent | Excellent | Excellent | Excellent | Excellent |
|  | Flex resistance |  |  |  | Excellent | Excellent | Excellent | Excellent | Excellent |
|  | Scratch resistance |  |  |  | Good | Good | Good | Good | Good |
|  | Scrape resistance |  |  |  | Good | Good | Good | Good | Good |
| Characteristics of laminated body | ITO laminated body | Haze |  | % | 0.8 | 0.6 | 0.9 | 0.8 | 0.7 |
|  |  | Total light transmittance |  | % | 90.8 | 91.0 | 90.6 | 91.0 | 90.9 |
|  |  | Transparency (visually checked) |  |  | Good | Good | Good | Good | Good |
|  |  | Conductivity |  |  | Good | Good | Good | Good | Good |
|  |  | Adhesiveness |  |  | Good | Good | Good | Good | Good |
|  |  | Curl by moisture absorption |  |  | Good | Good | Good | Good | Good |
|  | Copper foil laminated body | Heat Resistance |  |  | Good | Good | Good | Good | Good |
|  |  | Adhesiveness |  |  | Good | Good | Good | Good | Good |
|  |  | Curl by moisture absorption |  |  | Good | Good | Good | Good | Good |

[1]% by mass based on the entire components constituting the base film.
[2]parts by mass per 100 parts by mass of the resin constituting the resin layer.
[3]% by mass based on the entire components constituting the resin layer

TABLE 2

|  |  |  |  |  | Example | | | | |
|---|---|---|---|---|---|---|---|---|---|
|  |  |  |  |  | 6 | 7 | 8 | 9 | 10 |
| Configuration of laminated film | Base film | Resin type |  |  | A | A | A | A | A |
|  |  | Fine particle | Type |  | — | — | — | — | — |
|  |  |  | Particle diameter | μm | — | — | — | — | — |
|  |  |  | Content | %[1] | 0 | 0 | 0 | 0 | 0 |
|  |  | Thickness |  | μm | 50 | 50 | 50 | 50 | 50 |
|  | Resin layer | Resin | Aqueous dispersion type |  | E-1 | E-1 | E-1 | E-1 | E-1 |
|  |  | Crosslinking agent | Type |  | C-1 | C-1 | C-1 | C-1 | C-1 |
|  |  |  | Parts[2] |  | 10 | 10 | 10 | 10 | 10 |
|  |  | Fine particle A | Type |  | F-2 | F-2 | F-2 | F-2 | F-2 |
|  |  |  | Particle diameter | μm | 2.0 | 2.0 | 2.0 | 2.0 | 2.0 |
|  |  |  | Content | %[3] | 0.2 | 0.2 | 0.2 | 0.2 | 0.2 |
|  |  | Fine particle B | Type |  | F-1 | F-1 | F-1 | F-1 | F-1 |
|  |  |  | Particle diameter | μm | 0.075 | 0.075 | 0.075 | 0.075 | 0.075 |
|  |  |  | Content | %[3] | 1 | 1 | 1 | 1 | 1 |
|  |  | Fine particle content (A + B) |  | %[3] | 12 | 1.2 | 1.2 | 1.2 | 1.2 |
|  |  | Thickness |  | μm | 0.30 | 0.30 | 0.30 | 0.30 | 0.30 |
| Production conditions | Film production | Cooling roll temperature |  | °C. | 40 | 40 | 40 | 40 | 40 |
|  |  | Crystallization heat capacity |  | J/g | 27 | 27 | 27 | 27 | 27 |
|  |  | Unstretched film thickness |  | μm | 525 | 350 | 230 | 460 | 500 |
|  | Stretching | Biaxial stretching method |  |  | Sequential | Sequential | Sequential | Sequential | Sequential |
|  |  | Stretching ratio | Longitudinal direction | Times | 3.0 | 2.0 | 2.3 | 2.3 | 3.0 |
|  |  |  | Width direction | Times | 3.5 | 3.5 | 2.0 | 4.0 | 3.3 |
|  |  | Stretched or unstretched before and after application of coating agent | Before application |  | Stretched | Stretched | Stretched | Stretched | Stretched |
|  |  |  | After application |  | Stretched | Stretched | Stretched | Stretched | Stretched |
|  | Heat setting | Relaxation rate | Longitudinal direction | % | 6 | 6 | 8 | 6 | 1 |
|  |  |  | Width direction | % | 8 | 8 | 8 | 8 | 10 |
|  |  | Temperature |  | °C. | 275 | 275 | 275 | 275 | 265 |
| Characteristics of laminated film | Thermal shrinkage factor |  | Longitudinal direction | % | 1.0 | −0.2 | 0.5 | 0.0 | 1.5 |
|  |  |  | Width direction | % | −0.1 | 0.6 | −0.5 | 0.7 | 0.0 |
|  |  |  | \|Difference\| | % | 1.1 | 0.8 | 1.0 | 0.7 | 1.5 |

TABLE 2-continued

|  |  |  |  |  | Example | | | | |
|--|--|--|--|--|--|--|--|--|--|
|  |  |  |  |  | 6 | 7 | 8 | 9 | 10 |
|  |  | Tensile elongation at break | Longitudinal direction | % | 72 | 151 | 114 | 136 | 119 |
|  |  |  | Width direction | % | 116 | 82 | 175 | 71 | 122 |
|  |  | Haze |  | % | 2.3 | 0.8 | 0.6 | 0.9 | 0.7 |
|  |  | Total light transmittance |  | % | 89.7 | 91.0 | 91.1 | 90.9 | 91.9 |
|  |  | Dynamic friction coefficient |  |  | 0.43 | 0.43 | 0.43 | 0.43 | 0.42 |
|  |  | Close adhesion |  |  | 100 | 100 | 100 | 100 | 100 |
|  |  | Blocking resistance |  |  | Excellent | Excellent | Excellent | Excellent | Excellent |
|  |  | Flex resistance |  |  | Excellent | Excellent | Excellent | Excellent | Excellent |
|  |  | Scratch resistance |  |  | Good | Good | Good | Good | Good |
|  |  | Scrape resistance |  |  | Good | Good | Good | Good | Good |
| Characteristics of laminated body | ITO laminated body | Haze |  | % | 2.3 | 0.8 | 0.6 | 0.9 | — |
|  |  | Total light transmittance |  | % | 89.7 | 91.0 | 91.1 | 90.9 | — |
|  |  | Transparency (visually checked) |  |  | Good | Good | Good | Good | — |
|  |  | Conductivity |  |  | Good | Good | Good | Good | — |
|  |  | Adhesiveness |  |  | Good | Good | Good | Good | — |
|  |  | Curl by moisture absorption |  |  | Good | Good | Good | Good | — |
|  | Copper foil laminated body | Heat Resistance |  |  | Good | Good | Good | Good | — |
|  |  | Adhesiveness |  |  | Good | Good | Good | Good | — |
|  |  | Curl by moisture absorption |  |  | Good | Good | Good | Good | — |

[1] % by mass based on the entire components constituting the base film.
[2] parts by mass per 100 parts by mass of the resin constituting the resin layer.
[3] % by mass based on the entire components constituting the resin layer

TABLE 3

|  |  |  |  |  | Example | | |
|--|--|--|--|--|--|--|--|
|  |  |  |  |  | 11 | 12 | 13 |
| Configuration of laminated film | Base film | Resin type |  |  | A | A | A |
|  |  | Fine particle | Type |  | — | — | — |
|  |  |  | Particle diameter | μm | — | — | — |
|  |  |  | Content | %[1] | 0 | 0 | 0 |
|  |  | Thickness |  | μm | 50 | 50 | 50 |
|  | Resin layer | Resin | Aqueous dispersion type |  | E-1 | E-1 | E-1 |
|  |  | Crosslinking agent | Type |  | C-1 | C-1 | C-1 |
|  |  |  | Parts[2] |  | 10 | 10 | 10 |
|  |  | Fine particle A | Type |  | F-2 | F-2 | F-2 |
|  |  |  | Particle diameter | μm | 2.0 | 2.0 | 2.0 |
|  |  |  | Content | %[3] | 0.2 | 0.2 | 0.2 |
|  |  | Fine particle B | Type |  | F-1 | F-1 | F-1 |
|  |  |  | Particle diameter | μm | 0.075 | 0.075 | 0.075 |
|  |  |  | Content | %[3] | 1 | 1 | 1 |
|  |  | Fine particle content (A + B) |  | %[3] | 1.2 | 1.2 | 1.2 |
|  |  | Thickness |  | μm | 0.30 | 0.30 | 0.3 (both surfaces) |
| Production conditions | Film production | Cooling roll temperature |  | °C. | 40 | 40 | 40 |
|  |  | Crystallization heat capacity |  | J/g | 27 | 27 | 27 |
|  |  | Unstretched film thickness |  | μm | 400 | 400 | 400 |
|  | Stretching | Biaxial stretching method |  |  | Sequential | Sequential | Sequential |
|  |  | Stretching ratio | Longitudinal direction | Times | 2.3 | 2.3 | 2.3 |
|  |  |  | Width direction | Times | 3.5 | 3.5 | 3.5 |
|  |  | Stretched or unstretched before and after application of coating agent | Before application |  | Stretched | Stretched | Stretched |
|  |  |  | After application |  | Stretched | Stretched | Stretched |
|  | Heat setting | Relaxation rate | Longitudinal direction | % | 6 | 6 | 6 |
|  |  |  | Width direction | % | 8 | 8 | 8 |
|  |  | Temperature |  | °C. | 260 | 280 | 275 |
| Characteristics of laminated film | Thermal shrinkage factor | Longitudinal direction |  | % | 1.4 | 0.0 | 0.1 |
|  |  | Width direction |  | % | 1.2 | 0.0 | 0.2 |
|  |  | \|Difference\| |  | % | 0.2 | 0.0 | 0.1 |
|  | Tensile elongation at break | Longitudinal direction |  | % | 132 | 119 | 127 |
|  |  | Width direction |  | % | 89 | 94 | 99 |
|  | Haze |  |  | % | 0.5 | 1.0 | 0.7 |
|  | Total light transmittance |  |  | % | 91.1 | 90.7 | 90.8 |
|  | Dynamic friction coefficient |  |  |  | 0.43 | 0.43 | 0.43 |
|  | Close adhesion |  |  |  | 100 | 100 | 100 |

TABLE 3-continued

|  |  |  |  | Example | | |
|---|---|---|---|---|---|---|
|  |  |  |  | 11 | 12 | 13 |
|  |  | Blocking resistance |  | Excellent | Excellent | Excellent |
|  |  | Flex resistance |  | Excellent | Excellent | Excellent |
|  |  | Scratch resistance |  | Good | Good | Good |
|  |  | Scrape resistance |  | Good | Good | Good |
| Characteristics of laminated body | ITO laminated body | Haze | % | 0.5 | 1.0 | — |
|  |  | Total light transmittance | % | 91.1 | 90.7 | — |
|  |  | Transparency (visually checked) |  | Good | Good | — |
|  |  | Conductivity |  | Good | Good | — |
|  |  | Adhesiveness |  | Good | Good | — |
|  |  | Curl by moisture absorption |  | Good | Good | — |
|  | Copper foil laminated body | Heat Resistance |  | Good | Good | — |
|  |  | Adhesiveness |  | Good | Good | — |
|  |  | Curl by moisture absorption |  | Good | Good | — |

[1] % by mass based on the entire components constituting the base film.
[2] parts by mass per 100 parts by mass of the resin constituting the resin layer.
[3] % by mass based on the entire components constituting the resin layer

TABLE 4

|  |  |  |  |  | Example | | | | |
|---|---|---|---|---|---|---|---|---|---|
|  |  |  |  |  | 14 | 15 | 16 | 17 | 18 |
| Configuration of laminated film | Base film | Resin type |  |  | A | A | A | A | A |
|  |  | Fine particle | Type |  | — | — | — | — | — |
|  |  |  | Particle diameter | μm | — | — | — | — | — |
|  |  |  | Content | %[1] | 0 | 0 | 0 | 0 | 0 |
|  |  | Thickness |  | μm | 50 | 50 | 50 | 50 | 50 |
|  | Resin layer | Resin | Aqueous dispersion type |  | E-2 | L-1 | L-2 | L-3 | L-4 |
|  |  | Crosslinking agent | Type |  | C-1 | C-1 | C-1 | C-1 | C-1 |
|  |  |  | Parts[2] |  | 10 | 10 | 10 | 10 | 10 |
|  |  | Fine particle A | Type |  | F-2 | F-2 | F-2 | F-2 | F-2 |
|  |  |  | Particle diameter | μm | 2.0 | 2.0 | 2.0 | 2.0 | 2.0 |
|  |  |  | Content | %[3] | 0.2 | 0.2 | 0.2 | 0.2 | 0.2 |
|  |  | Fine particle B | Type |  | F-1 | F-1 | F-1 | F-1 | F-1 |
|  |  |  | Particle diameter | μm | 0.075 | 0.075 | 0.075 | 0.075 | 0.075 |
|  |  |  | Content | %[3] | 1 | 1 | 1 | 1 | 1 |
|  |  | Fine particle content (A + B) |  | %[3] | 1.2 | 1.2 | 1.2 | 1.2 | 1.2 |
|  |  | Thickness |  | μm | 0.30 | 0.30 | 0.30 | 0.30 | 0.30 |
| Production conditions | Film production | Cooling roll temperature |  | °C. | 40 | 40 | 40 | 40 | 40 |
|  |  | Crystallization heat capacity |  | J/g | 27 | 27 | 27 | 27 | 27 |
|  |  | Unstretched film thickness |  | μm | 400 | 400 | 400 | 400 | 400 |
|  | Stretching | Biaxial stretching method |  |  | Sequential | Sequential | Sequential | Sequential | Sequential |
|  |  | Stretching ratio | Longitudinal direction | Times | 2.3 | 2.3 | 2.3 | 2.3 | 2.3 |
|  |  |  | Width direction | Times | 3.5 | 3.5 | 3.5 | 3.5 | 3.5 |
|  |  | Stretched or unstretched before and after application of coating agent | Before application |  | Stretched | Stretched | Stretched | Stretched | Stretched |
|  |  |  | After application |  | Stretched | Stretched | Stretched | Stretched | Stretched |
|  | Heat setting | Relaxation rate | Longitudinal direction | % | 6 | 6 | 8 | 6 | 8 |
|  |  |  | Width direction | % | 8 | 8 | 8 | 8 | 8 |
|  |  | Temperature |  | °C. | 275 | 275 | 275 | 275 | 275 |
| Characteristics of laminated film | Thermal shrinkage factor | Longitudinal direction |  | % | 0.1 | 0.1 | 0.1 | 0.1 | 0.1 |
|  |  | Width direction |  | % | 0.2 | 0.2 | 0.2 | 0.2 | 0.1 |
|  |  | |Difference| |  | % | 0.1 | 0.1 | 0.1 | 0.1 | 0.1 |
|  | Tensile elongation at break | Longitudinal direction |  | % | 129 | 129 | 128 | 128 | 129 |
|  |  | Width direction |  | % | 96 | 99 | 99 | 98 | 100 |
|  | Haze |  |  | % | 0.6 | 0.6 | 0.6 | 0.5 | 0.7 |
|  | Total light transmittance |  |  | % | 91.0 | 91.0 | 91.0 | 91.3 | 90.8 |
|  | Dynamic friction coefficient |  |  |  | 0.41 | 0.39 | 0.39 | 0.37 | 0.45 |
|  | Close adhesion |  |  |  | 100 | 100 | 100 | 100 | 100 |
|  | Blocking resistance |  |  |  | Excellent | Excellent | Excellent | Excellent | Excellent |
|  | Flex resistance |  |  |  | Excellent | Excellent | Excellent | Excellent | Excellent |
|  | Scratch resistance |  |  |  | Good | Good | Good | Good | Good |
|  | Scrape resistance |  |  |  | Good | Good | Good | Good | Good |
| Characteristics of laminated body | ITO laminated body | Haze |  | % | — | — | — | — | — |
|  |  | Total light transmittance |  | % | — | — | — | — | — |
|  |  | Transparency (visually checked) |  |  | — | — | — | — | — |
|  |  | Conductivity |  |  | — | — | — | — | — |

TABLE 4-continued

|  |  |  | Example | | | | |
|---|---|---|---|---|---|---|---|
|  |  |  | 14 | 15 | 16 | 17 | 18 |
|  |  | Adhesiveness | — | — | — | — | — |
|  |  | Curl by moisture absorption | — | — | — | — | — |
|  | Copper foil | Heat Resistance | — | — | — | — | — |
|  | laminated | Adhesiveness | — | — | — | — | — |
|  | body | Curl by moisture absorption | — | — | — | — | — |

[1] % by mass based on the entire components constituting the base film.
[2] parts by mass per 100 parts by mass of the resin constituting the resin layer.
[3] % by mass based on the entire components constituting the resin layer

TABLE 5

|  |  |  |  |  | Example | | | |
|---|---|---|---|---|---|---|---|---|
|  |  |  |  |  | 19 | 20 | 21 | 22 |
| Configuration of laminated film | Base film | Resin type |  |  | A | A | A | A |
|  |  | Fine particle | Type |  | — | — | — | — |
|  |  |  | Particle diameter | μm | — | — | — | — |
|  |  |  | Content | %[1] | 0 | 0 | 0 | 0 |
|  |  | Thickness |  | μm | 50 | 50 | 50 | 50 |
|  | Resin layer | Resin | Aqueous dispersion type |  | E-1 | E-1 | E-1 | E-1 |
|  |  | Crosslinking agent | Type |  | C-1 | C-1 | C-1 | C-1 |
|  |  |  | Parts[2] |  | 10 | 10 | 10 | 10 |
|  |  | Fine particle A | Type |  | F-2 | F-3 | F-3 | F-3 |
|  |  |  | Particle diameter | μm | 2.0 | 5.0 | 5.0 | 5.0 |
|  |  |  | Content | %[3] | 0.2 | 0.1 | 0.2 | 2.2 |
|  |  | Fine particle B | Type |  | — | F-1 | F-1 | F-1 |
|  |  |  | Particle diameter | μm | — | 0.075 | 0.075 | 0.075 |
|  |  |  | Content | %[3] | — | 1 | 1 | 1 |
|  |  | Fine particle content (A + B) |  | %[3] | 0.2 | 1.1 | 1.2 | 3.2 |
|  |  | Thickness |  | μm | 0.30 | 0.30 | 0.30 | 0.30 |
| Production conditions | Film production | Cooling roll temperature |  | ° C. | 40 | 40 | 40 | 40 |
|  |  | Crystallization heat capacity |  | J/g | 27 | 27 | 27 | 27 |
|  |  | Unstretched film thickness |  | μm | 400 | 400 | 400 | 400 |
|  | Stretching | Biaxial stretching method |  |  | Sequential | Sequential | Sequential | Sequential |
|  |  | Stretching ratio | Longitudinal direction | Times | 2.3 | 2.3 | 2.3 | 2.3 |
|  |  |  | Width direction | Times | 3.5 | 3.5 | 3.5 | 3.5 |
|  |  | Stretched or unstretched before and after application of coating agent | Before application |  | Stretched | Stretched | Stretched | Stretched |
|  |  |  | After application |  | Stretched | Stretched | Stretched | Stretched |
|  | Heat setting | Relaxation rate | Longitudinal direction | % | 6 | 6 | 6 | 6 |
|  |  |  | Width direction | % | 8 | 8 | 8 | 8 |
|  |  | Temperature |  | ° C. | 275 | 275 | 275 | 275 |
| Characteristics of laminated film | Thermal shrinkage factor | Longitudinal direction |  | % | 0.1 | 0.1 | 0.1 | 0.1 |
|  |  | Width direction |  | % | 0.2 | 0.1 | 0.2 | 0.2 |
|  |  | \|Difference\| |  | % | 0.1 | 0.0 | 0.1 | 0.1 |
|  | Tensile elongation at break | Longitudinal direction |  | % | 129 | 129 | 128 | 127 |
|  |  | Width direction |  | % | 100 | 100 | 98 | 98 |
|  | Haze |  |  | % | 0.6 | 0.5 | 0.5 | 2.5 |
|  | Total light transmittance |  |  | % | 91.1 | 91.2 | 91.4 | 90.0 |
|  | Dynamic friction coefficient |  |  |  | 0.44 | 0.47 | 0.37 | 0.30 |
|  | Close adhesion |  |  |  | 100 | 100 | 100 | 100 |
|  | Blocking resistance |  |  |  | Good | Excellent | Excellent | Excellent |
|  | Flex resistance |  |  |  | Excellent | Excellent | Excellent | Excellent |
|  | Scratch resistance |  |  |  | Good | Good | Good | Good |
|  | Scrape resistance |  |  |  | Good | Good | Good | Good |
| Characteristics of laminated body | ITO laminated body | Haze |  | % | — | — | — | — |
|  |  | Total light transmittance |  | % | — | — | — | — |
|  |  | Transparency (visually checked) |  |  | — | — | — | — |
|  |  | Conductivity |  |  | — | — | — | — |
|  |  | Adhesiveness |  |  | — | — | — | — |
|  |  | Curl by moisture absorption |  |  | — | — | — | — |

TABLE 5-continued

|  |  |  | Example | | | |
|---|---|---|---|---|---|---|
|  |  |  | 19 | 20 | 21 | 22 |
| Copper foil laminated body | Heat Resistance | | — | — | — | — |
| | Adhesiveness | | — | — | — | — |
| | Curl by moisture absorption | | — | — | — | — |

[1]) % by mass based on the entire components constituting the base film.
[2]) parts by mass per 100 parts by mass of the resin constituting the resin layer.
[3]) % by mass based on the entire components constituting the resin layer

TABLE 6

| | | | | | Example | | | | |
|---|---|---|---|---|---|---|---|---|---|
| | | | | | 23 | 24 | 25 | 26 | 27 |
| Configuration of laminated film | Base film | Resin type | | | A | A | A + M1 | A | B |
| | | Fine particle | Type | | — | — | F-4 | — | — |
| | | | Particle diameter | μm | — | — | 1.7 | — | — |
| | | | Content | %[1] | 0 | 0 | 0.025 | 0 | 0 |
| | | Thickness | | μm | 25 | 75 | 50 | 25 | 25 |
| | Resin layer | Resin | Aqueous dispersion type | | E-1 | E-1 | E-1 | E-1 | E-1 |
| | | Crosslinking agent | Type | | C-1 | C-1 | C-1 | C-1 | C-1 |
| | | | Parts[2] | | 10 | 10 | 10 | 10 | 10 |
| | | Fine particle A | Type | | F-2 | F-2 | F-2 | F-2 | E-2 |
| | | | Particle diameter | μm | 2.0 | 2.0 | 2.0 | 2.0 | 2.0 |
| | | | Content | %[3] | 0.2 | 0.2 | 0.2 | 0.2 | 0.2 |
| | | Fine particle B | Type | | F-1 | F-1 | F-1 | F-1 | F-1 |
| | | | Particle diameter | μm | 0.075 | 0.075 | 0.075 | 0.075 | 0.075 |
| | | | Content | %[3] | 1 | 1 | 1 | 1 | 1 |
| | | Fine particle content (A + B) | | %[3] | 1.2 | 1.2 | 1.2 | 1.2 | 1.2 |
| | | Thickness | | μm | 0.30 | 0.30 | 0.30 | 0.30 | 0.30 |
| Production conditions | Film production | Cooling roll temperature | | °C. | 40 | 40 | 40 | 40 | 40 |
| | | Crystallization heat capacity | | J/g | 27 | 27 | 27 | 27 | 27 |
| | | Unstretched film thickness | | μm | 200 | 600 | 400 | 250 | 150 |
| | Stretching | Biaxial stretching method | | | Sequential | Sequential | Sequential | Sequential | Sequential |
| | | Stretching ratio | Longitudinal direction | Times | 2.3 | 2.3 | 2.3 | 3.0 | 2.5 |
| | | | Width direction | Times | 3.5 | 3.5 | 3.5 | 3.3 | 2.5 |
| | | Stretched or unstretched before and after application of coating agent | Before application | | Stretched | Stretched | Stretched | Unstretched | Unstretched |
| | | | After application | | Stretched | Stretched | Stretched | Stretched | Stretched |
| | Heat setting | Relaxation rate | Longitudinal direction | % | 6 | 6 | 6 | 6 | 6 |
| | | | Width direction | % | 8 | 8 | 8 | 8 | 8 |
| | | Temperature | | °C. | 275 | 275 | 275 | 275 | 275 |
| Characteristics of laminated film | Thermal shrinkage factor | | Longitudinal direction | % | −0.1 | 0.1 | 0.1 | −0.1 | 0.1 |
| | | | Width direction | % | 0.0 | 0.1 | 0.2 | 0.8 | −0.1 |
| | | | \|Difference\| | % | 0.1 | 0.0 | 0.1 | 0.9 | 0.2 |
| | Tensile elongation at break | | Longitudinal direction | % | 131 | 130 | 116 | 143 | 113 |
| | | | Width direction | % | 98 | 100 | 91 | 97 | 115 |
| | Haze | | | % | 0.7 | 0.9 | 2.1 | 0.8 | 1.0 |
| | Total light transmittance | | | % | 90.9 | 90.7 | 89.9 | 90.7 | 90.7 |
| | Dynamic friction coefficient | | | | 0.43 | 0.43 | 0.41 | 0.40 | 0.41 |
| | Close adhesion | | | | 100 | 100 | 100 | 1000 | 100 |
| | Blocking resistance | | | | Excellent | Excellent | Excellent | Excellent | Excellent |
| | Flex resistance | | | | Excellent | Excellent | Excellent | Excellent | Excellent |
| | Scratch resistance | | | | Good | Good | Good | Good | Good |
| | Scrape resistance | | | | Good | Good | Good | Good | Good |
| Characteristics of laminated body | ITO laminated body | Haze | | % | — | — | — | — | — |
| | | Total light transmittance | | % | — | — | — | — | — |
| | | Transparency (visually checked) | | | — | — | — | — | — |
| | | Conductivity | | | — | — | — | — | — |
| | | Adhesiveness | | | — | — | — | — | — |
| | | Curl by moisture absorption | | | — | — | — | — | — |
| | Copper foil laminated body | Heat Resistance | | | — | — | — | — | — |
| | | Adhesiveness | | | — | — | — | — | — |
| | | Curl by moisture absorption | | | — | — | — | — | — |

[1]) % by mass based on the entire components constituting the base film.
[2]) parts by mass per 100 parts by mass of the resin constituting the resin layer.
[3]) % by mass based on the entire components constituting the resin layer

TABLE 7

|  |  |  |  |  | Comparative Example | | | | |
|---|---|---|---|---|---|---|---|---|---|
|  |  |  |  |  | 1 | 2 | 3 | 4 | 5 |
| Configuration of laminated film | Base film | Resin type |  |  | A | A | A | A | A |
|  |  | Fine particle | Type |  | — | — | — | — | — |
|  |  |  | Particle diameter | μm | — | — | — | — | — |
|  |  |  | Content | %[1] | 0 | 0 | 0 | 0 | 0 |
|  |  | Thickness |  | μm | 50 | 50 | 50 | 50 | 50 |
|  | Resin layer | Resin | Aqueous dispersion type |  | E-1 | E-1 | E-1 | E-1 | E-1 |
|  |  | Crosslinking agent |  | Type | C-1 | C-1 | C-1 | C-1 | C-1 |
|  |  |  |  | Parts[2] | 10 | 10 | 10 | 10 | 10 |
|  |  | Fine particle A | Type |  | F-2 | F-2 | F-2 | F-2 | E-2 |
|  |  |  | Particle diameter | μm | 2.0 | 2.0 | 2.0 | 2.0 | 2.0 |
|  |  |  | Content | %[3] | 0.2 | 0.2 | 0.2 | 0.2 | 0.2 |
|  |  | Fine particle B | Type |  | F-1 | F-1 | F-1 | F-1 | F-1 |
|  |  |  | Particle diameter | μm | 0.075 | 0.075 | 0.075 | 0.075 | 0.075 |
|  |  |  | Content | %[3] | 1 | 1 | 1 | 1 | 1 |
|  |  | Fine particle content (A + B) |  | %[3] | 1.2 | 1.2 | 1.2 | 1.2 | 1.2 |
|  |  | Thickness |  | μm | 0.30 | 0.30 | 0.30 | 0.30 | 0.30 |
| Production conditions | Film production | Cooling roll temperature |  | °C. | 40 | 40 | 40 | 40 | 50 |
|  |  | Crystallization heat capacity |  | J/g | 27 | 27 | 27 | 27 | 19 |
|  |  | Unstretched film thickness |  | μm | 400 | 400 | 400 | 400 | 400 |
|  | Stretching | Biaxial stretching method |  |  | Sequential | Sequential | Sequential | Sequential | Sequential |
|  |  | Stretching ratio | Longitudinal direction | Times | 2.3 | 2.3 | 2.3 | 2.3 | 2.3 |
|  |  |  | Width direction | Times | 3.5 | 3.5 | 3.5 | 3.5 | 3.5 |
|  |  | Stretched or unstretched before and after application of coating agent | Before application |  | Stretched | Stretched | Stretched | Stretched | Stretched |
|  |  |  | After application |  | Stretched | Stretched | Stretched | Stretched | Stretched |
|  | Heat setting | Relaxation rate | Longitudinal direction | % | 0 | 8 | 8 | 6 | 6 |
|  |  |  | Width direction | % | 8 | 0 | 8 | 8 | 8 |
|  |  | Temperature |  | °C. | 275 | 275 | 250 | 287 | 275 |
| Characteristics of laminated film | Thermal shrinkage factor | Longitudinal direction |  | % | 1.8 | 0.0 | 4.3 | −0.4 | 0.4 |
|  |  | Width direction |  | % | 0.5 | 2.3 | 4.5 | −0.2 | 0.4 |
|  |  | |Difference| |  | % | 1.3 | 2.3 | 0.2 | 0.2 | 0.0 |
|  | Tensile elongation at break | Longitudinal direction |  | % | 96 | 129 | 139 | 72 | 93 |
|  |  | Width direction |  | % | 109 | 87 | 107 | 53 | 66 |
|  | Haze |  |  | % | 0.6 | 0.6 | 0.5 | 2.3 | 0.2 |
|  | Total light transmittance |  |  | % | 91.1 | 91.0 | 91.1 | 89.7 | 89.8 |
|  | Dynamic friction coefficient |  |  |  | 0.43 | 0.43 | 0.43 | 0.41 | 0.43 |
|  | Close adhesion |  |  |  | 100 | 100 | 100 | 100 | 100 |
|  | Blocking resistance |  |  |  | Excellent | Excellent | Excellent | Excellent | Excellent |
|  | Flex resistance |  |  |  | Excellent | Excellent | Excellent | Excellent | Excellent |
|  | Scratch resistance |  |  |  | Good | Good | Good | Good | Good |
|  | Scrape resistance |  |  |  | Good | Good | Good | Good | Good |
| Characteristics of laminated body | ITO laminated body | Haze |  | % | 0.6 | 0.6 | 0.5 | — | 2.2 |
|  |  | Total light transmittance |  | % | 91.1 | 91.0 | 91.1 | — | 89.8 |
|  |  | Transparency (visually checked) |  |  | Good | Good | Good | — | Good |
|  |  | Conductivity |  |  | Good | Good | Good | — | Good |
|  |  | Adhesiveness |  |  | Good | Good | Good | — | Good |
|  |  | Curl by moisture absorption |  |  | Fair | Fair | Fair | — | Good |
|  | Copper foil laminated body | Heat Resistance |  |  | Poor | Poor | Poor | — | Good |
|  |  | Adhesiveness |  |  | Poor | Poor | Poor | — | Poor |
|  |  | Curl by moisture absorption |  |  | Fair | Fair | Fair | — | Good |

[1] % by mass based on the entire components constituting the base film.
[2] parts by mass per 100 parts by mass of the resin constituting the resin layer.
[3] % by mass based on the entire components constituting the resin layer

TABLE 8

|  |  |  |  |  | Comparative Example | | | |
|---|---|---|---|---|---|---|---|---|
|  |  |  |  |  | 6 | 7 | 8 | 9 |
| Configuration of laminated film | Base film | Resin type |  |  | A + M1 | A | A | A |
|  |  | Fine particle | Type |  | F-4 | — | — | — |
|  |  |  | Particle diameter | μm | 1.7 | — | — | — |
|  |  |  | Content | %[1] | 0.025 | 0 | 0 | 0 |
|  |  | Thickness |  | μm | 50 | 50 | 50 | 25 |

TABLE 8-continued

|  |  |  |  | Comparative Example | | | |
|---|---|---|---|---|---|---|---|
|  |  |  |  | 6 | 7 | 8 | 9 |
|  | Resin layer | Resin | Aqueous dispersion type | E-1 | — | E-1 | E-1 |
|  |  | Crosslinking agent | Type | C-1 | — | C-1 | C-1 |
|  |  |  | Parts[2)] | 10 | — | 10 | C-1 |
|  |  | Fine particle A | Type | F-2 | — | — | F-2 |
|  |  |  | Particle diameter μm | 2.0 | — | — | 2.0 |
|  |  |  | Content %[3)] | 0.2 | — | — | 0.2 |
|  |  | Fine particle B | Type | F-1 | — | — | F-1 |
|  |  |  | Particle diameter μm | 0.075 | — | — | 0.075 |
|  |  |  | Content %[3)] | 1 | — | — | 1 |
|  |  | Fine particle content (A + B) | %[3)] | 1.2 | — | — | 1.2 |
|  |  | Thickness | μm | 0.30 | — | 0.30 | 0.30 |
| Production conditions | Film production | Cooling roll temperature | °C. | 40 | 40 | 40 | 40 |
|  |  | Crystallization heat capacity | J/g | 27 | 27 | 27 | 27 |
|  |  | Unstretched film thickness | μm | 500 | 400 | 400 | 250 |
|  | Stretching | Biaxial stretching method |  | Sequential | Sequential | Sequential | Simultaneous |
|  |  | Stretching ratio | Longitudinal direction Times | 2.8 | 2.3 | 2.3 | 3.0 |
|  |  |  | Width direction Times | 3.5 | 3.5 | 3.5 | 3.3 |
|  |  | Stretched or unstretched before and after application of coating agent | Before application | Stretched | Stretched | Stretched | Unstretched |
|  |  |  | After application | Stretched | Stretched | Stretched | Stretched |
|  | Heat setting | Relaxation rate | Longitudinal direction % | 6 | 6 | 6 | 2 |
|  |  |  | Width direction % | 8 | 8 | 8 | 8 |
|  |  | Temperature | °C. | 275 | 275 | 275 | 250 |
| Characteristics of laminated film | Thermal shrinkage factor | Longitudinal direction | % | 0.9 | 0.0 | 0.1 | 4.4 |
|  |  | Width direction | % | 0.0 | 0.1 | 0.2 | 3.0 |
|  |  | |Difference| | % | 0.9 | 0.1 | 0.1 | 1.4 |
|  | Tensile elongation at break | Longitudinal direction | % | 84 | 126 | 128 | 144 |
|  |  | Width direction | % | 110 | 102 | 100 | 125 |
|  | Haze |  | % | 5.9 | 0.3 | 0.5 | 0.6 |
|  | Total light transmittance |  | % | 89.2 | 91.6 | 9.7 | 91.0 |
|  | Dynamic friction coefficient |  |  | 0.42 | 0.99 | 0.88 | 0.43 |
|  | Close adhesion |  |  | 100 | — | 100 | 100 |
|  | Blocking resistance |  |  | Excellent | Poor | Poor | Excellent |
|  | Flex resistance |  |  | Excellent | Excellent | Excellent | Excellent |
|  | Scratch resistance |  |  | Good | Poor | Poor | Good |
|  | Scrape resistance |  |  | Good | Good | Good | Good |
| Characteristics of laminated body | ITO laminated body | Haze | % | 5.8 | 0.8 | 0.3 | 0.5 |
|  |  | Total light transmittance | % | 89.2 | 91.0 | 91.6 | 91.7 |
|  |  | Transparency (visually checked) |  | Poor | Good | Good | Good |
|  |  | Conductivity |  | Good | Good | Fair | Fair |
|  |  | Adhesiveness |  | Good | Fair | Good | Poor |
|  |  | Curl by moisture absorption |  | Good | Fair | — | — |
|  | Copper foil laminated body | Heat Resistance |  | Good | Poor | Poor | — |
|  |  | Adhesiveness |  | Good | Poor | Poor | Poor |
|  |  | Curl by moisture absorption |  | Good | Fair | — | — |

[1)]% by mass based on the entire components constituting the base film.
[2)]parts by mass per 100 parts by mass of the resin constituting the resin layer.
[3)]% by mass based on the entire components constituting the resin layer The laminated films of Examples 1 to 27 have the configuration specified in the present invention, resulting in high close adhesion between the base film and the resin layer, good transparency, reduced thermal shrinkage factors in the longitudinal direction and in the transverse direction, and sufficiently increased tensile elongations at break in the longitudinal direction and in the transverse direction.

Also, the laminated body obtained by forming the ITO coating on the laminated film did not lose transparency and had good adhesiveness with the ITO coating, as well as reduced deformation such as curl due to moisture absorption. In addition, the laminated body obtained by laminating the copper foil on the laminated film also had good adhesiveness with the copper foil and reduced deformation such as curl under high temperature conditions such as reflow soldering or under wet heat conditions.

In the laminated films of Comparative Examples 1 to 3 and 9, the thermal shrinkage factors in the longitudinal direction and in the width direction were each beyond the predetermined range. The laminated bodies having the ITO coating formed thereon were curled due to moisture absorption, while the laminated bodies having the copper foil laminated thereon had inferior heat resistance and adhesiveness and were curled due to moisture absorption.

The laminated film of Comparative Example 4 had a low tensile elongation at break in the width direction.

In Comparative Example 5, the unstretched film was highly crystallized and the stretching stress during film stretching was high, and the obtained laminated film had a low tensile elongation at break in the width direction.

In Comparative Example 6, during film stretching, separation occurred between the constituent semi-aromatic polyamide and silica particles in the base film, resulting in the generation of voids. The obtained laminated film had low transparency and an inferior haze value, and the laminated body having the ITO coating formed thereon also lost transparency.

In Comparative Example 7, the base film without the resin layer laminated thereon had inferior blocking resistance, dynamic friction coefficient, and scratch resistance. The laminated body having the ITO coating formed thereon had inferior adhesiveness, and the laminated body having the copper foil laminated thereon also had both inferior heat resistance and adhesiveness.

In the laminated film of Comparative Example 8, the resin layer did not contain particles, thus resulting in insufficient blocking resistance. The laminated body having the ITO coating formed thereon and the laminated body having the copper foil laminated thereon both had inferior adhesiveness, as well as inferior conductivity and heat resistance.

The invention claimed is:

1. A laminated film having a resin layer laminated on at least one surface of a base film, wherein:
   the base film is a semi-aromatic polyamide film that has been at least uniaxially stretched;
   the semi-aromatic polyamide is made of a dicarboxylic acid component consisting of terephthalic acid (100 mol % of terephthalic acid) and a diamine component containing 60 to 100 mol % of 1,9-nonanediamine and 2-methyl-1,8-octanediamine in total in the diamine component;
   the resin layer contains first fine particles with an average particle diameter of 0.3 μm to 4.0 μm and second fine particles with an average particle diameter of 0.01 μm to 0.2 μm;
   a thermal shrinkage factor in a longitudinal direction $S_{MD}$ and a thermal shrinkage factor in a width direction $S_{TD}$ of the film when treated under conditions of 250° C.×5 min are each −1.0 to 1.5%;
   tensile elongations at break in the longitudinal direction and in the width direction are each 70% or more; and
   a haze is 3% or less.

2. The laminated film according to claim 1, wherein an absolute value of a difference between $S_{MD}$ and $S_{TD}$ ($|S_{MD}-S_{TD}|$) is less than 1.2.

3. The laminated film according to claim 1, wherein the resin layer has a thickness of 0.03 to 0.5 μm.

4. The laminated film according to claim 1, having a dynamic friction coefficient of 0.7 or less under an atmosphere of 23° C.×50% RH on a surface of the resin layer.

5. The laminated film according to claim 1, wherein the base film has the fine particles at a content of 0 to 0.2% by mass and the resin layer has the fine particles at a content of 0.1 to 5.0% by mass.

6. The laminated film according to claim 1, wherein a resin constituting the resin layer contains one selected from the group consisting of a polyamide-based resin, a polyurethane-based resin, and an acrylic resin.

7. An electronic material using the laminated film according to claim 1.

8. An optical component using the laminated film according to claim 1.

9. A method for producing the laminated film according to claim 1, comprising the following steps (a) to (f):
   (a) extruding a semi-aromatic polyamide from a die and cooling with a moving coolant at 30 to 40° C. to produce an unstretched film with a crystallization heat capacity of 20 J/g or more;
   (b) applying a coating agent for resin layer formation to at least one surface of the film made of semi-aromatic polyamide to form a coating film;
   (c) drying the coating film;
   (d) stretching the film in the longitudinal direction at a ratio of 2.0 to 3.5 times and in the width direction at a ratio of 2.0 to 4.0 times;
   (e) subjecting a stretched film to a heat setting treatment at 252° C. to (Tm−5° C.) and to a relaxation treatment with a relaxation rate of 1.0 to 10.0% in the longitudinal direction and 1.0 to 12.0% in the width direction; and
   (f) rolling the stretched film up.

* * * * *